(12) United States Patent
Kondo et al.

(10) Patent No.: US 12,124,695 B2
(45) Date of Patent: Oct. 22, 2024

(54) MOBILE TERMINAL DEVICE AND INPUT DEVICE

(71) Applicant: Sony Group Corporation, Tokyo (JP)

(72) Inventors: Kazuhiro Kondo, Kanagawa (JP);
Takashi Hasegawa, Kanagawa (JP);
Tatsuhiko Nishimura, Tokyo (JP);
Daisuke Matsui, Tokyo (JP);
Masatoshi Inagawa, Tokyo (JP);
Tetsuro Inukai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/567,911

(22) Filed: Jan. 4, 2022

(65) Prior Publication Data
US 2022/0129150 A1 Apr. 28, 2022

Related U.S. Application Data

(63) Continuation of application No. 14/730,521, filed on Jun. 4, 2015, now Pat. No. 11,249,642, which is a
(Continued)

(51) Int. Cl.
*G06F 3/048* (2013.01)
*G06F 3/0354* (2013.01)
(Continued)

(52) U.S. Cl.
CPC ...... *G06F 3/04886* (2013.01); *G06F 3/03545* (2013.01); *G06F 3/041* (2013.01);
(Continued)

(58) Field of Classification Search
None
See application file for complete search history.

(56) References Cited

U.S. PATENT DOCUMENTS

| 2002/0175940 A1 | 11/2002 | Lection et al. |
| 2004/0100479 A1* | 5/2004 | Nakano ................ G06F 3/0485 |
| | | 715/700 |

(Continued)

FOREIGN PATENT DOCUMENTS

| EP | 2 051 158 A2 | 4/2009 |
| EP | 2 079 010 A2 | 7/2009 |

(Continued)

OTHER PUBLICATIONS

European Office Action issued May 22, 2014 in Patent Application No. 10 197 307.1.

(Continued)

*Primary Examiner* — Thanh T Vu
(74) *Attorney, Agent, or Firm* — XSENSUS LLP

(57) ABSTRACT

A mobile terminal device includes a display section having a display screen, an input section having a touch input region on the display screen, and a control section for displaying a plurality of keys. The display screen is provided as a software keyboard where a touch operation on a specific key causes an input of the specific key. In the specific display region on the display screen that can display operation keys on the software keyboard, the control section selects these keys from a previously prepared set of input candidate key groups. In response to a specific operation on the specific display region, the control section allows the plurality of keys to be displayed on the specific display region. In response to touch on a desired key in the specific display region, the control section determines that an input of the key has been performed.

15 Claims, 28 Drawing Sheets

Related U.S. Application Data continuation of application No. 12/906,668, filed on Oct. 18, 2010, now Pat. No. 9,081,499.

(60) Provisional application No. 61/309,467, filed on Mar. 2, 2010.

(51) Int. Cl.
    *G06F 3/041*     (2006.01)
    *G06F 3/04817*     (2022.01)
    *G06F 3/0482*     (2013.01)
    *G06F 3/0483*     (2013.01)
    *G06F 3/0485*     (2022.01)
    *G06F 3/04883*     (2022.01)
    *G06F 3/04886*     (2022.01)

(52) U.S. Cl.
CPC ........ *G06F 3/04817* (2013.01); *G06F 3/0482* (2013.01); *G06F 3/0483* (2013.01); *G06F 3/0485* (2013.01); *G06F 3/04883* (2013.01); *G06F 2203/04101* (2013.01); *G06F 2203/04104* (2013.01); *G06F 2203/04803* (2013.01); *G06F 2203/04807* (2013.01)

(56) References Cited

U.S. PATENT DOCUMENTS

| | | |
|---|---|---|
| 2005/0034084 A1 | 2/2005 | Ohtsuki et al. |
| 2005/0140654 A1 | 6/2005 | Chen |
| 2006/0015812 A1 | 1/2006 | Cunningham et al. |
| 2006/0075355 A1 | 4/2006 | Shiono et al. |
| 2006/0084478 A1 | 4/2006 | Erlichmen |
| 2007/0115389 A1 | 5/2007 | McCarthy et al. |
| 2007/0224972 A1 | 9/2007 | Van Regenmorter |
| 2007/0256029 A1* | 11/2007 | Maxwell ............... G06F 3/0482 345/173 |
| 2008/0066007 A1 | 3/2008 | Lau et al. |
| 2008/0318635 A1 | 12/2008 | Yoon et al. |
| 2009/0077464 A1 | 3/2009 | Goldsmith et al. |
| 2009/0097753 A1 | 4/2009 | Millington |
| 2009/0119614 A1* | 5/2009 | Tienvieri ............. G06F 16/532 715/786 |
| 2009/0153250 A1 | 6/2009 | Rofougaran |
| 2009/0163250 A1* | 6/2009 | Park ..................... H04M 1/2747 715/810 |
| 2009/0167706 A1* | 7/2009 | Tan ..................... G06F 3/04886 345/173 |
| 2009/0307631 A1 | 12/2009 | Kim et al. |
| 2010/0004029 A1 | 1/2010 | Kim |
| 2010/0115447 A1 | 5/2010 | Kuo et al. |
| 2010/0123724 A1* | 5/2010 | Moore ................ H04M 1/7243 345/173 |
| 2010/0164895 A1 | 7/2010 | Kim et al. |
| 2012/0173982 A1 | 7/2012 | Herz et al. |
| 2014/0173494 A1 | 6/2014 | Goldsmith et al. |

FOREIGN PATENT DOCUMENTS

| | | |
|---|---|---|
| JP | 2000-322181 A | 11/2000 |
| JP | 2003-256117 A | 9/2003 |
| JP | 2009-288873 A | 12/2009 |
| WO | 2008/086319 A1 | 7/2008 |
| WO | 2009/096646 A1 | 8/2009 |
| WO | 2011/131989 A1 | 10/2011 |

OTHER PUBLICATIONS

Search Report issued Mar. 30, 2011 in European Patent Application No. 10197307.1-1527.
Extended European Search Report issued Oct. 15, 2015 in Patent Application No. 15175110.4.
Extended European Search Report dated Jul. 12, 2019, issued in corresponding European Patent Application No. 19171384.1.

* cited by examiner

FIG. 19

| GROUP | ICON | NAME |
|---|---|---|
| A |  | TELEPHONE APPLICATION |
| A |  | MAILING APPLICATION |
| A |  | ADDRESS BOOK APPLICATION |
| A |  | MESSENGER APPLICATION |
| B |  | MUSIC APPLICATION |
| B |  | MOVIE APPLICATION |
| B |  | GAME APPLICATION |
| B |  | ONE-SEGMENT BROADCASTING APPLICATION |
| C |  | MAP APPLICATION |
| C |  | WEATHER APPLICATION |
| C |  | SCHEDULE APPLICATION |
| C |  | WEB APPLICATION |
| D |  | INITIAL-SETTING APPLICATION |
| D |  | DATA BOX |
| D |  | CAMERA APPLICATION |
| D |  | CALCULATOR APPLICATION |

A: MESSAGE GROUP
B: MEDIA GROUP
C: UTILITY FUNCTION GROUP
D: OTHERS

MOBILE TERMINAL DEVICE AND INPUT DEVICE

CROSS-REFERENCE TO RELATED APPLICATIONS

This application is a continuation of U.S. application Ser. No. 14/730,521 filed Jun. 4, 2015, which is a continuation of U.S. Ser. No. 12/906,668, filed Oct. 18, 2010 (now U.S. Pat. No. 9,081,499), which claims the benefit of priority under 35 U.S.C. § 119(e) of U.S. Provisional Application Ser. No. 61/309,467, filed Mar. 2, 2010, the entire contents of each are incorporated herein by reference.

BACKGROUND OF THE INVENTION

1. Field of the Invention

The present disclosure relates to a mobile terminal device having an input section with a touch input region superimposed on a display screen and to an input device provided for such a mobile terminal device.

2. Description of the Related Art

Heretofore, mobile phone terminals have been designed to input characters as well as numerals by assigning characters to numeric keys, or hardware keys, respectively. In this case, two or more characters are assigned to the same key so that a desired character can be input as a result of selecting the corresponding key by switching character types and pushing the key predetermined times. However, this procedure may lead to complicated and time-consuming operation because of an increase in average number of times of pushing the key until it reaches the character of interest.

For improving such a procedure, there is proposed a technology for inputting a desired character by displaying a representative image of character classification on a display screen, operating a rotary input section to specify a desired class to display a list of characters belonging to the class, and then operating the rotary input section again to select the desired character from the list (see, Japanese Unexamined Patent Application Publication No. 2003-256117).

Furthermore, there is also proposed a software keyboard for personal digital assistant, where an input region is defined on a display screen to display a full keyboard. The software keyboard includes keys that allow the user to input a desired character by pointing an input pen at the corresponding key (see, Japanese Unexamined Patent Application Publication No. 2000-322181, which will be also referred to as JP 2000-322181 A).

In recent years, there is also proposed a technology for allowing the user to point a desired character from characters displayed on the display screen on a touch panel using the user's own finger without using an input pen (see, Japanese Unexamined Patent Application Publication No. 2009-288873, which will be also referred to as JP 2009-288873 A).

SUMMARY

The software keyboard described in JP 2000-322181 A is provided for pointing a desired character using a fine-tipped input pen to mimic a real hardware keyboard while making the size of each key smaller.

On the other hand, when pointing by the user's finger, the number of letters which can be displayed at once will be restricted to the minimum even though it is called a full keyboard. For responding to a request for arrangement of many keys on the limited display screen of a mobile terminal device, specific characters, such as various symbols, may be hardly provided.

In a technology disclosed in JP 2009-288873 A, for responding such a request, a set of characters to be displayed on a display screen at once is divided into several groups, such as those for ten keys, first characters of the respective lines of the Japanese "HIRAGANA" system, and letters of the alphabet, so as to allot two or three words to one of keys assigned to a plurality of sheets. The sheets are layered and displayed and the instruction of the user allows the desired sheet to be selectively displayed on the top. In this case, any of various symbols can be input through an additional screen which can be appeared by selecting a "symbol" key arranged on one corner of each sheet. The same is also applied to punctuation or the like.

In this technology, the additional screen should be displayed every time any of specific characters, such as punctuation and other various symbols, are input.

Thus, every time the input of a character not included in a software keyboard is asked for, it is common for known technologies to make the user switch an input mode to additionally display a list of specific characters on an additional screen.

However, some specific characters to be displayed on the additional screen, such as a comma, a period, and a question mark are frequently used for input of an English text, as well as punctuation and the like for input of a Japanese text. The input operation may be complicated and take a much time for switching an input mode every time the input of such a character is requested by displaying the additional screen. In addition, the continuity of operation can be broken by switching the screen, resulting in a decrease in operability.

If an additional screen for the list of specific characters is displayed while the software keyboard represented on the display is left as it is, an input area for text can be temporary narrowed and the operability of the software keyboard can be decreased.

The present invention takes the aforementioned technologies into consideration and allows a user to input a desired specific key by selecting the corresponding key comparatively quickly and easily without changing a software keyboard present on a display as much as possible and without additionally necessitating an excessively wide display/input area.

A mobile terminal device according to an embodiment of the present invention includes a display section having a display screen, an input section having a touch input region superimposed on the display screen, and a control section that displays a software keyboard having a plurality of keys on the display screen in response to a touching operation on a certain key among the keys. The control section selects the plurality of keys from a set of input candidate key groups and displays them on a specific display region where a plurality of operation keys sequentially arranged on the software keyboard can be displayed. According to a specific operation to the specific display region, the control section allows the display unit to display the plurality of keys after replacement of the plurality of keys displayed on the specific display region in response to a specific operation on the specific display region, and the control section concludes that an input of the key has been performed in response to a touch on a desired specific display region without movement.

In this configuration, among keys displayed on the specific display region, which are those of a specific key group which does not appear on the software keyboard other than the specific display region, a desired key can be comparatively quickly and easily selected and entered while the software keyboard itself is being displayed as it is.

For example, the set of input candidate key groups includes keys corresponding to a plurality of pages in which the plurality of keys are assigned to one page, and the control section switches pages one by one in response to the specific operation. Such page switching allows the user to confirm more input candidate keys in a short period of time.

The control section may allow the specific display region to display a page position indicator graphically displaying the position of a currently displayed page among all pages of the set of input candidate key groups. The page position indicator allows the user to easily recognize which one of pages of the input candidate key group is represented.

The specific operation may be a flick operation that moves a touching position within the specific display region at a speed not lower than a predetermined speed. Therefore, the user can intuitively perform page switching in no time at all.

An input device according to an embodiment of the present invention is a device which can be built in the above mobile terminal device. The input device includes an input section having a touch input region superimposed on the display screen, and a control section having a software keyboard including a plurality of operation keys to be activated by touching on the display screen. In the specific display region on the display screen, which is able to display a plurality of operation keys continuously arranged on the software keyboard, the control section allows the plurality of keys to be selected from a previously prepared set of input candidate key groups. In addition, the control section allows the display unit to display the plurality of keys after replacement of the plurality of keys displayed on the specific display region in response to a specific operation on the specific display region. Furthermore, the control section determines that the desired key in the specific display region has been input by being touched thereon without movement.

Other embodiments and operation effects thereof according to the present invention will be described later.

According to any embodiment of the present invention, the user is allowed to input a desired specific key by selecting the corresponding key comparatively quickly and easily without changing a software keyboard present on a display as much as possible and without additionally necessitating an excessively wide display/input area.

BRIEF DESCRIPTION OF THE DRAWINGS

FIG. 19 is a diagram illustrating examples of icons that represent the respective function keys with respect to the modified example shown in FIG. 18;

DESCRIPTION OF THE PREFERRED EMBODIMENTS

Hereinafter, preferred embodiments of the present invention will be described with reference to the attached drawings.

Figure 1:
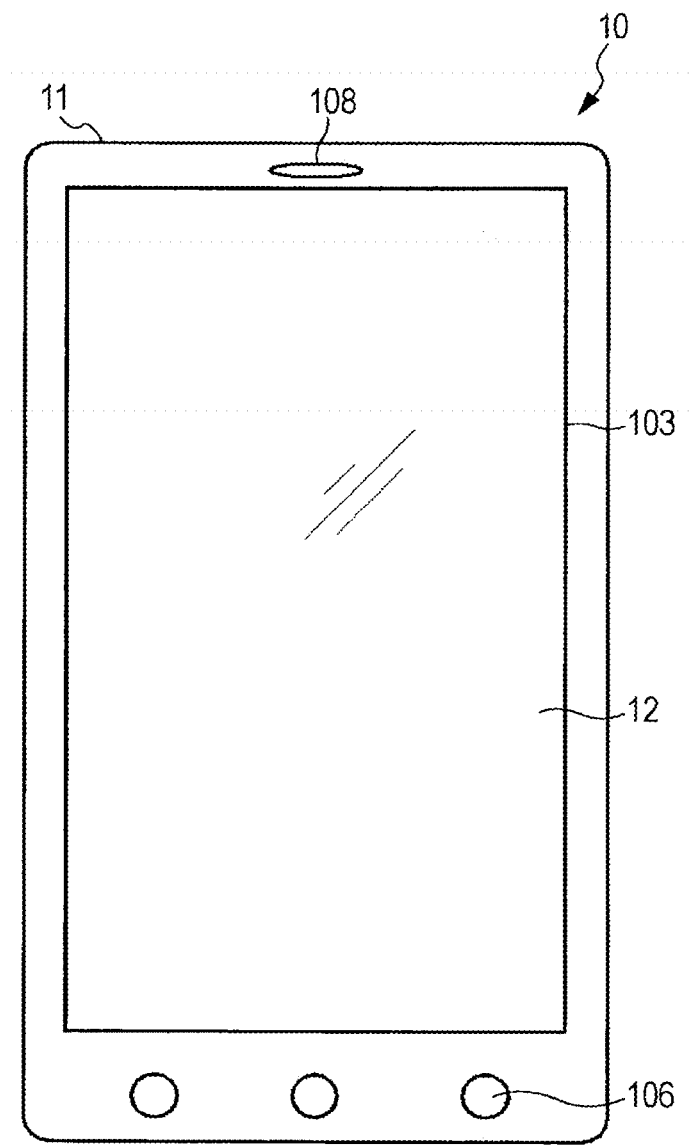
FIG. 1 is a front, view illustrating the appearance of a mobile terminal apparatus according to an embodiment of the present invention.

FIG. 1 is an external view of a mobile terminal device 10 according to an embodiment of the present invention.

The mobile terminal device 10 includes a display screen 12 that occupies a large area on the front side of its housing 11. A touch panel 13 is superimposed on the display screen 12. The touch panel 103 has an input region corresponding to the display region of the display screen 12 to allow the user to perform a touch input operation with a user's finger or the like. A speaker (ear receiver) 108 is arranged on the upper side of the display screen 12 and two or more operation keys 106 (in this example, three keys) are arranged on the lower side thereof. As will be described later, the user enters characters or the like into the mobile terminal device 10 using a software keyboard. Thus, the mobile terminal device 10 is not provided with a hardware full keyboard and a numeric keypad.

Here, the operation principle and configuration of a touch sensor to be employed in this embodiment may be based on one which is common in the art. Thus, the details of the touch sensor will be omitted in the following description.

Figure 2:
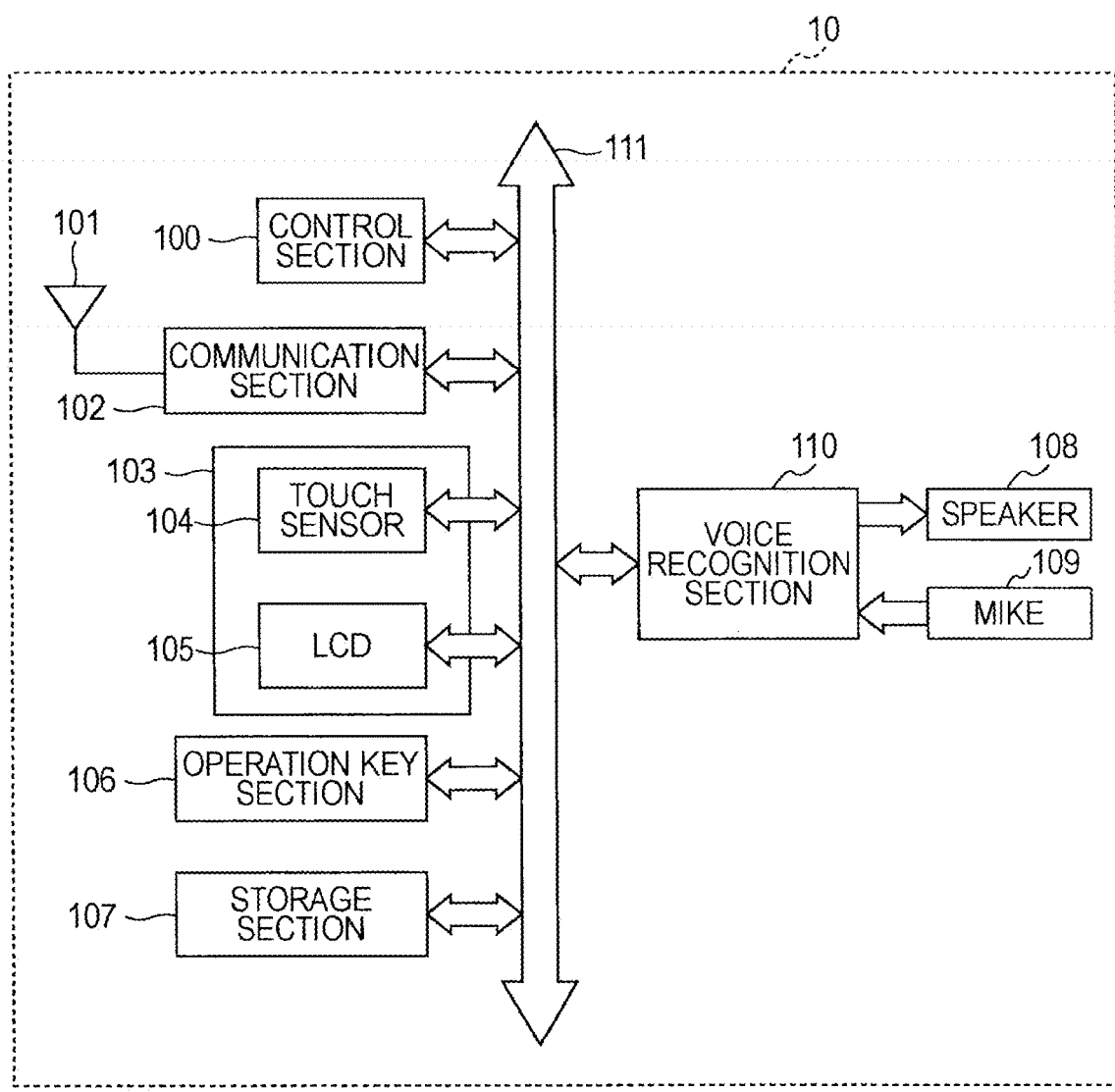
FIG. 2 is a block diagram representing the inner hardware configuration of the mobile terminal.

FIG. 2 is a block diagram representing the inner hardware configuration of the mobile terminal device 10. The mobile terminal device 10 of the present embodiment is exemplified by a cellular phone terminal.

The mobile terminal device 10 includes a control section 100, a communication section 102, a touch panel 103, an operation key section 106, a storage section 107, a voice processing section 110 and so on, which are connected to one another through a bus 111.

The control section 100 includes a processor, such as a central processing unit (CPU), and serves as means for controlling each section under the control of software.

The communication unit 102 is connected to a base station (not shown) by wireless communication via an antenna 101 and serves as means for communication via a telephone, an electric mail, or the like.

The touch panel 103 includes a display part 105, such as a liquid crystal display (LCD) that displays information on its display screen. The touch panel 103 also includes a touch sensor 104 superimposed on the display surface. The touch sensor 104 can sense where the portion (i.e., position) on the display screen the user touches on.

The voice processing section 110 is connected to both a speaker 108 and a microphone 109 to perform voice processing and input/output control.

The operation key section 106 is a hardware key pad for allowing the user to enter instructions or information into the mobile terminal device 10. However, the hardware key pad is not an indispensable element in the description of the present embodiment.

The storage section 107 includes a memory, for example, a read-only memory for storing various kinds of data as well as computer programs to be executed by the CPU of the control section 100 (which may be a rewritable non-volatile memory, such as a flush memory), and a random access memory (RAM) that offers a work area and a temporally storage area. The storage section 107 may also include a mass storage device, such as an external memory device or a hard disk drive (HDD). As will be described later, the various kinds of data include key data, such as data for specific key groups, as well as control data for input candidate key groups, usage frequency of each of specific keys, usage frequency of each of pages, and various kinds of pointers.

The mobile terminal device 10 may include, but not shown in the figure, any of other structural components, such as a battery, a camera section, a short-range wireless communication section, and a noncontact IC card.

In the configuration of the mobile terminal device 10, an input device according to an embodiment of the present invention includes the touch sensor 104 and the control section 100. Here, the touch sensor 104 is an input section having a touch input region superimposed on the surface screen. In addition, the control section 100 allows the display screen to display a software keyboard having a plurality of operation keys which can receive the instructions from the user by touching.

Figure 3:
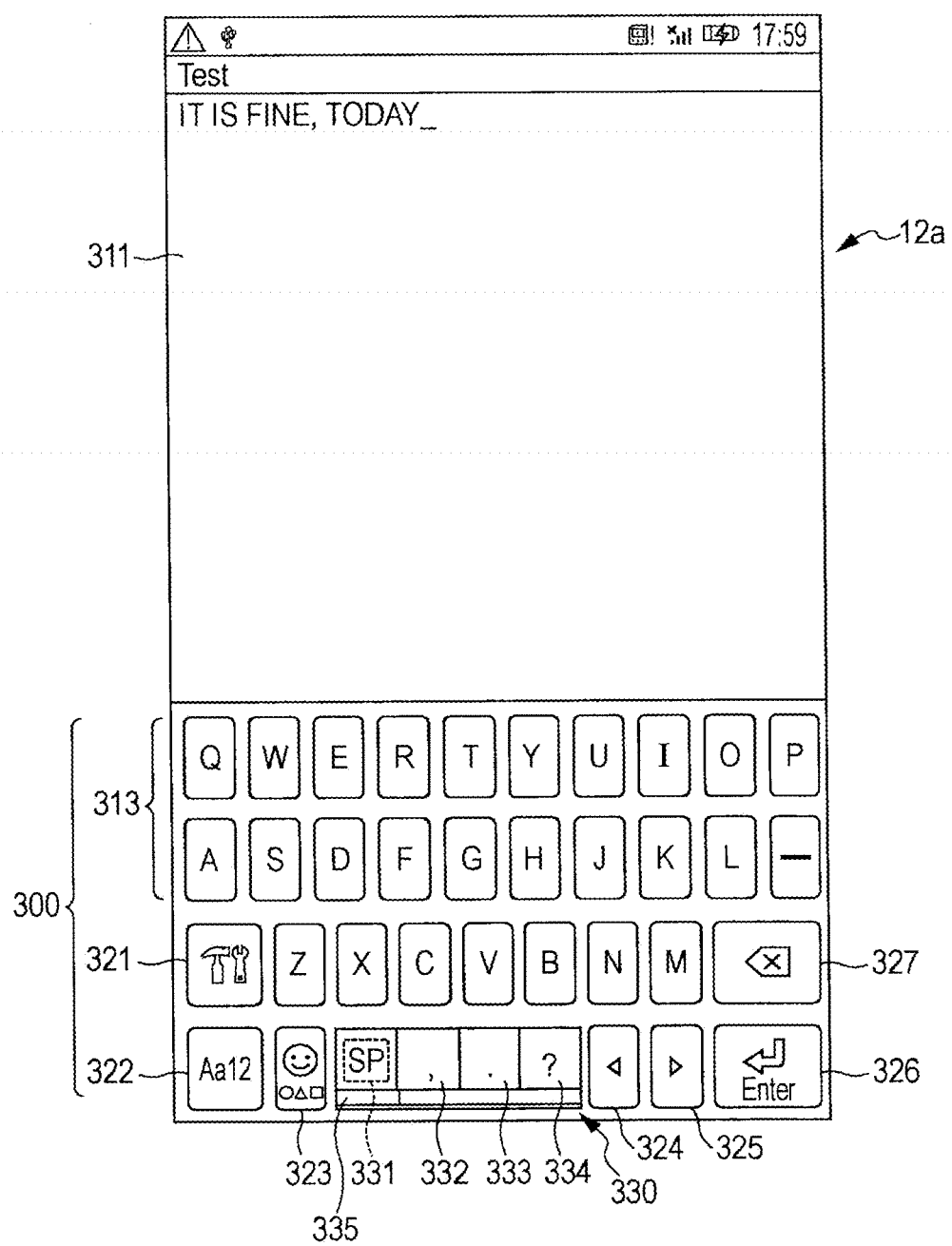
FIG. 3 is a diagram illustrating an input display screen as an example of display screen for key input used in the mobile phone shown in FIG. 1.

FIG. 3 is a diagram illustrating an input display screen 12a as an exemplary display screen for key-input. On this display screen 12a, a software keyboard 300 and other software keys are arranged and displayed. This example shows a so-called full keyboard with QWERTY layout. The software keyboard 300 includes character keys 313 with QWERTY layout, a setup key 321, an input mode key 322, a symbol key 323, a specific display region 330, right and left keys 324 and 325, an enter (decision) key 326, and a backspace key 327. The specific display region 330 is a window-like display region that selectively displays a predetermined number of specific keys (in this example, four specific keys 331, 332, 333, and 334) among input candidates of a predetermined number of specific keys.

In FIG. 3, the arrangement of capital letter alphabets is illustrated as an example of the character keys 313 with QWERTY layout. Furthermore, by operating the input mode key 322, input modes can be cyclically changed from a Japanese KANA input mode, an English alphabet input mode, and a numeric input mode in order, thereby cyclically displaying the software keyboards corresponding to the respective input modes, That is, by pressing or touching the input mode key 322, the mode of keys being displayed, which corresponds to the character keys 313, is changed from one mode to another in the order of the KANA mode, the alphabet mode, and the numeric mode. In the case of the numeric mode, a typical numeric key arrangement can be displayed. In the case of the KANA mode, the alphabetic keyboard being displayed may be remained as it is to convert alphabetic letters to Japanese letters by the Roman letter input.

The setup key 321 is a link key for transferring to a character-input setting screen. In the alphabetic character input mode, the setup key 321 is changed to a shift key. The user can capitalize or de-capitalize an alphabetic letter by pressing the shift key.

Figure 4:
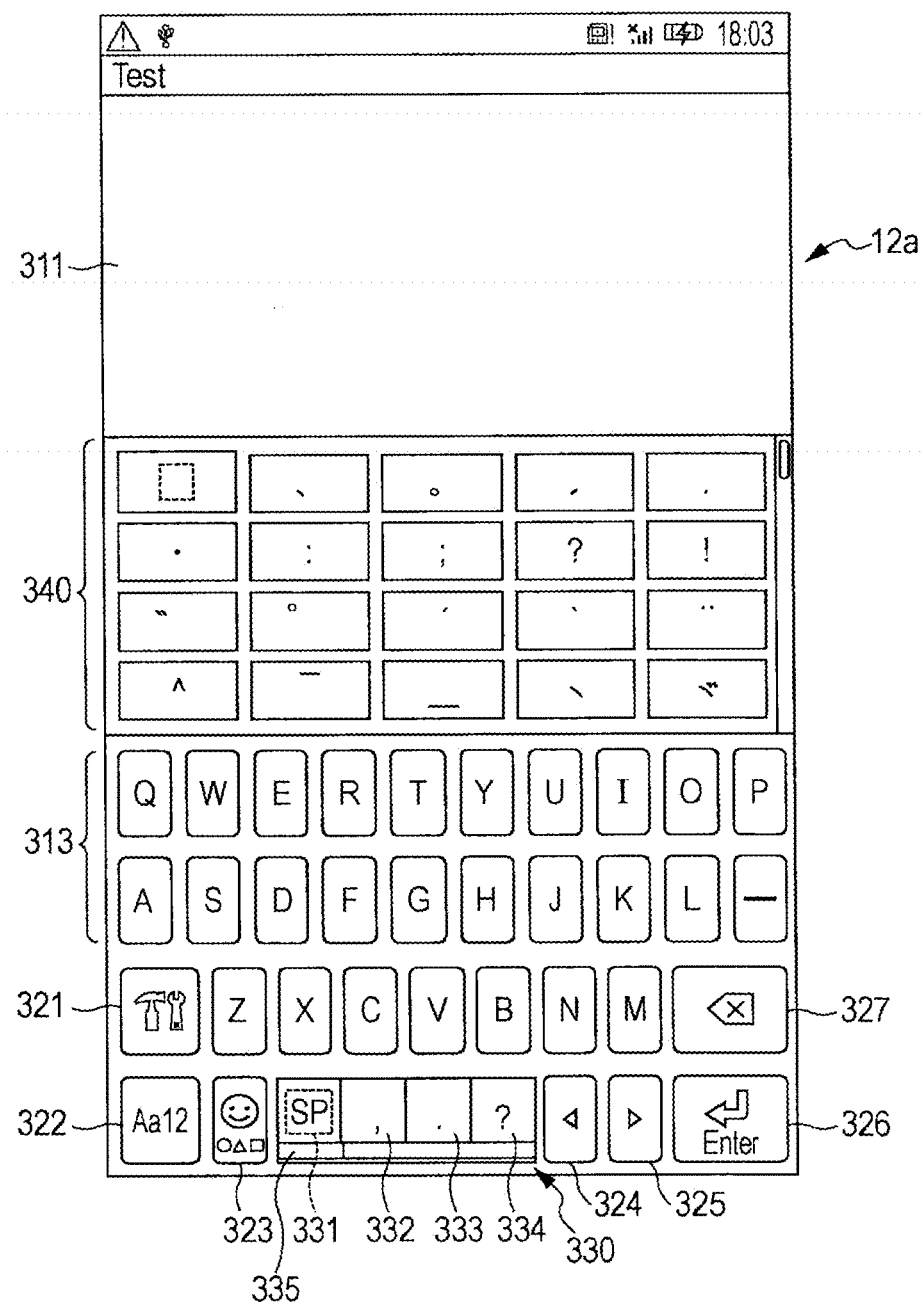
FIG. 4 is a diagram illustrating a surface unit representing a region for listing specific keys, such as various kinds of symbols.

A symbol key 323 is provided for displaying a region 340 for listing specific keys, such as various symbols, as shown in FIG. 4 (specific key list) in response to the operation of the symbol key 323. In the present embodiment, the term "specific key" refers to one corresponding to characters, such as various kinds of symbol keys and punctuation, which are not represented on the software keyboard if there is no specific display region as described above. Thus, the specific key list region 340 is a region for displaying a list of such keys. The user can input any of the specific keys by touching the corresponding key (character). If all keys intended for the list display are not be simultaneously displayed on a specific key list region 340, a so-called page switching and a scrolling operation may be employed to display all keys. As will be disclosed later, the specific keys may include those for activating icons, pictorial symbols, and the like which represent the respective applications and functions.

Right and left keys 324 and 325 are direction-instructing keys which can be used for operating a cursor or the like.

Enter (decision) key 326 and backspace key 327 are known operation keys for dew, e lining any operation and deleting an input character, respectively.

The control section 100 selects two or more keys from a previously prepared set of input candidate key groups and then allows the specific display region 330 to display the selected keys. Here, the specific display region 330 is able to display two or more operation keys continuously arranged on the software keyboard. The control section 100 also switches these two or more keys displayed on the specific display region 330 in response to a specific operation on this region and then displays the switched keys. Furthermore, the control section 100 determines that the desired key in the specific display region 330 has been input by being touched thereon without movement (specifically, one key is touched and then untouched).

As shown in FIG. 3, the specific display region 330 is a region where a comparatively frequently used key among various sign keys can be input without displaying the specific key list region 340. In this example, in general, such a region utilizes one where a large-sized (horizontally long) space key is arranged on the center position on the lower side of the QWERTY layout. Briefly, two or more keys are simultaneously displayed on the specific display region 330 and any key being touched by the user can be input.

In FIG. 3, there is illustrated an example of displaying characters on the character displaying region 311 of the display screen, where characters are directly entered by an inline input method. Alternatively, an additional character input region (not shown) may be formed. First, characters are input in this character input region and then accepted. Subsequently, the determined character string is moved to the character display region 311.

Furthermore, the character display region 311 is assumed to be used for the body area of mail. Alternatively, the present embodiment is also applicable to a character input box of a memo pad, telephone directory, or the like, an entry field, bulletin board, or the like in a web page, and any character input.

In the character input display screen 12a shown in FIG. 3, a set of input candidate key groups, part of which can be selectively displayed on the specific display region 330, includes keys corresponding to two or more pages where each page includes two or more keys.

In response to a specific operation, the control section 100 switches the keys to be displayed on the specific display region 330 on the page basis.

FIG. 5 is a diagram illustrating an example of switching pages on the specific display region 330 according to the embodiment of the present invention. In this example, four successive keys can be displayed on the horizontally long specific display region 330. Every page is provided with four keys, so that keys of three pages can be selectively displayed by switching the pages.

Figure 5A:
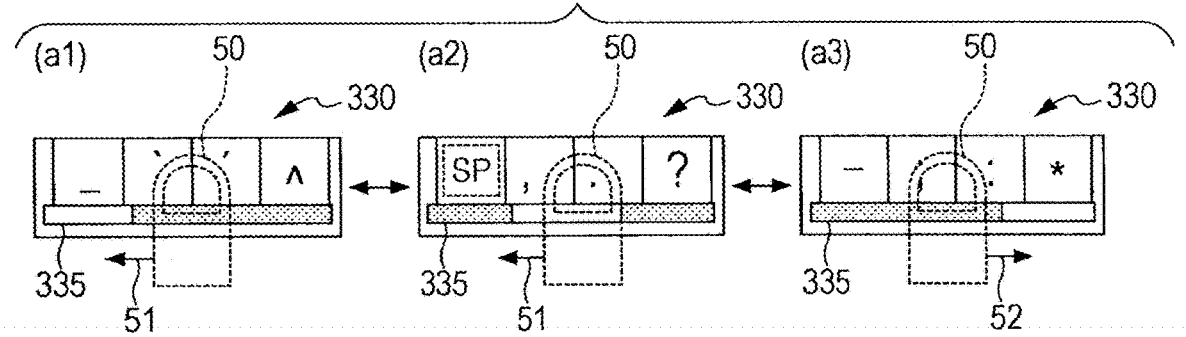
FIGS. 5A, 5B, 5C, 5D and 5E are diagrams illustrating an example of switching pages on the specific display region according to an embodiment of the present invention.

In FIG. 5A, (a1) to (a3) are three different pages where each page includes four symbols. Thus, 12 symbols are in total as a sum of three pages and provided as a "previously defined set of input candidate key groups". A page position indicator 335, a bar extending in a longitudinal direction, is displayed on the lower inner side of the specific display region 330. The page position indicator 335 is provided for graphically representing the position of a page presently displayed on the specific display region 330 among the whole pages of the set of input candidate key groups.

The set of input candidate key groups may be initially defined by the user. Alternatively, as will be described later, input candidate keys may be automatically replaced depending on the usage frequency on the learning basis.

The pages can be switched from one to another by a specific operation of the user on the specific display region 330. In this embodiment, the term "specific operation" used herein refers to an operation in which the finger of the user touches on one position on the touch panel and then moves to another position at a speed of not less than a predetermined velocity in a predetermined direction while being touched on the touch panel (such an operation is also known as a "flick operation").

In (a1) of FIG. 5A, the page position indicator 335 indicates that a page on the left side of the three pages arranged in juxtaposition is being displayed. This page includes an underbar, a left single quotation mark, and a right single quotation mark. In this state, the user may touch one point in the specific display region 330 by the finger 50 of the user and a flick operation is then performed in a left direction (direction of the arrow 51), leading to display the next (center) page as shown in (a2) of FIG. 5A. Such a state can be reflected to the display of the page position indicator 335. This page includes a space (SP), a comma, a period, and a question mark. In this state, if the user touches one point in the specific display region 330 by his or her finger 50 and then performs a flick operation to the left, then the page on the right end can be displayed as shown in (a3) of FIG. 5A. This state is reflected on the display of the page indicator 335. This page includes a hyphen, a semicolon, a colon, and an asterisk. In this state, if the user touches one point in the specific display region 330 by his or her finger 50 and then performs a flick operation to the right (in the direction of the arrow 52), then the page to be displayed to change to the center page as shown in (a2) of FIG. 5A. When considering a state that four keys on a piece of horizontally long paper that represents a key sequence of 12 keys is exposed from a window corresponding to four keys, such an operation resembles an operation of moving a piece of paper to the right or left on a disk by the user's finger (but one flick operation leads to the movement by one page, four keys). Furthermore, the input candidate keys represented on the specific display region 330 may be automatically changed depending on the character species which is presently selected. In the case of a specific character type (for example, a numeric character), any specific display region 330 may be absent.

Figure 5B:
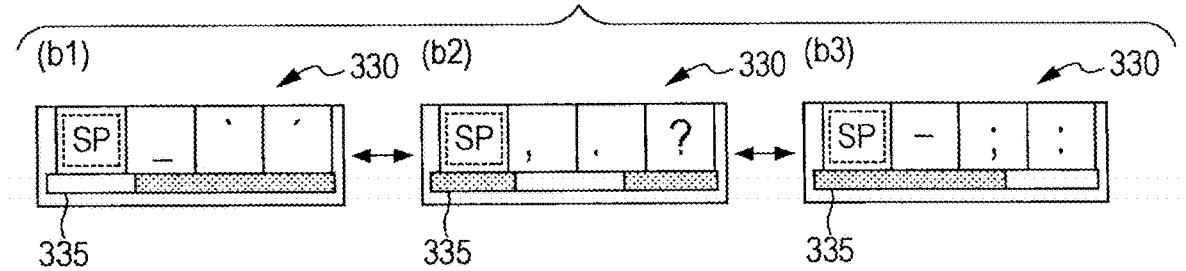

Referring now to FIG. 5B, (b1) to (b3) illustrate a second example of the page configuration of keys displayed in the specific display region 330. In the example of (a1) to (a3) of FIG. 5A, keys included in all pages are different from one another. In contrast, in the example shown in FIG. 5B allows different pages to include the same key. Any key with high usage frequency may be included in two or more different pages to reduce the number of times of switching the pages. In the example shown in (b1) to (b3) of FIG. 5B, a space key (SP) is included in each of the pages. Such an arrangement of the pages can be prepared by default. Alternatively, it may be selectively generated by the setting, operation of the user.

Figure 5C:
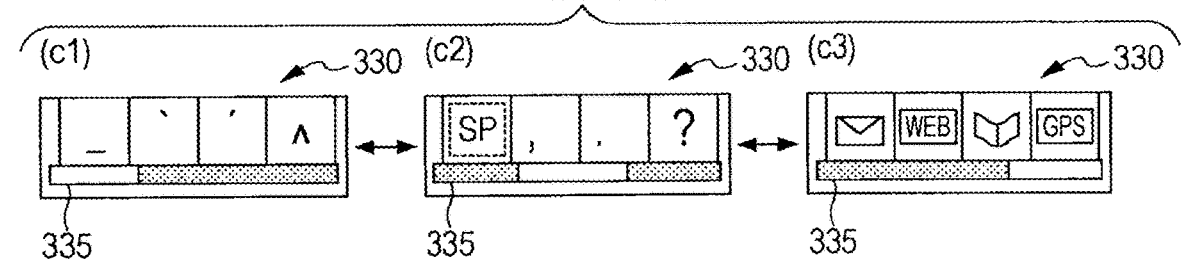

Referring now to FIG. 5C, (c1) to (c3) illustrate a third example of the page configuration of keys displayed in the specific display region 330. In the aforementioned example, only character keys are arranged on the specific display region 330. In contrast, in this example, function keys are also included in addition to the character keys.

In other words, in FIG. 5C, (c1) and (c3) are character key pages and (c3) is a page of function keys. The term "function key" used herein refers to a key that activates any of functions imparted to the mobile terminal device, such as a mail function, a web browsing function, a telephone directory function, and a map-application (or GPS) function. The function keys in the specific display region 330 are provided with icons that represent the corresponding key functions, respectively. In this case, the number of different characters which can be input using the specific display region 330 decreases in comparison with that of (a1) to (a3) in FIG. 5A. In order to avoid such a reduction, an additional page (fourth page or any of the subsequent pages) of a function key may be added to three pages of (a1) to (a3) in FIG. 5A. The number of function keys is not limited to four. Although only one page serves as a function key page in the above description, it may be alternatively considered that function keys may be distributed to two more pages. In addition, each page may include a combination of characteristic keys and function keys.

Figure 5D:
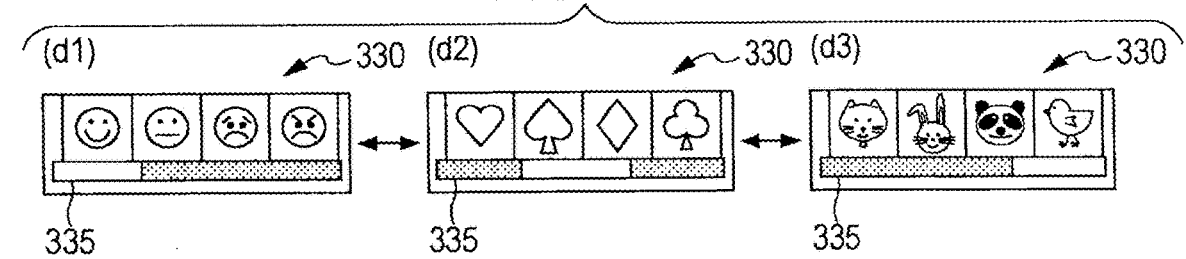

Referring now to FIG. 5D, (d1) to (d3) illustrate a fourth example of the page configuration of keys displayed in the specific display region 330. In this example, keys represented in the specific display region 330 only include so-called pictorial symbols that use images as their integrants. A page may be also constructed of a combination of the pictorial symbol page and the aforementioned symbol page (not shown).

Figure 5E:
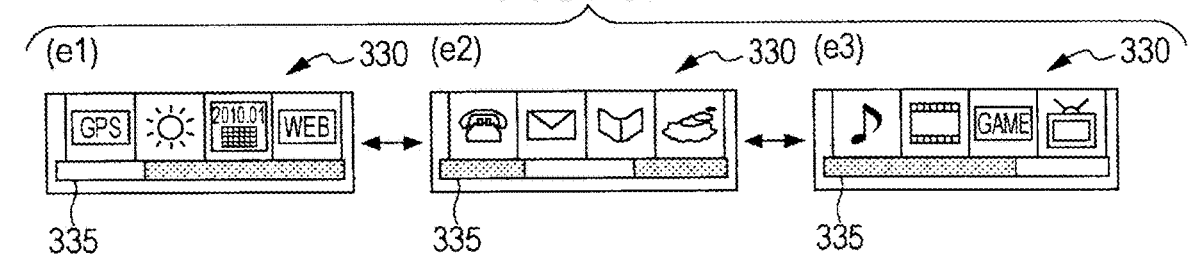

Referring now to FIG. 5E, (e1) to (e3) illustrate a fifth example of the page configuration of keys displayed in the specific display region 330. In this example, keys represented in the specific display region 330 are only icons that represent the respective functional keys.

In any of these page configurations, the number of pages to be switched in the specific display region 330 is not limited to the above examples. For instance, any number of pages may be employed. In addition, the number of keys per page is not limited to four. In the above examples, each page has the same number of keys and the same size of the key areas. Alternatively, the number of keys and the sizes of the key areas may be different depending on their assigned pages.

Figure 6:
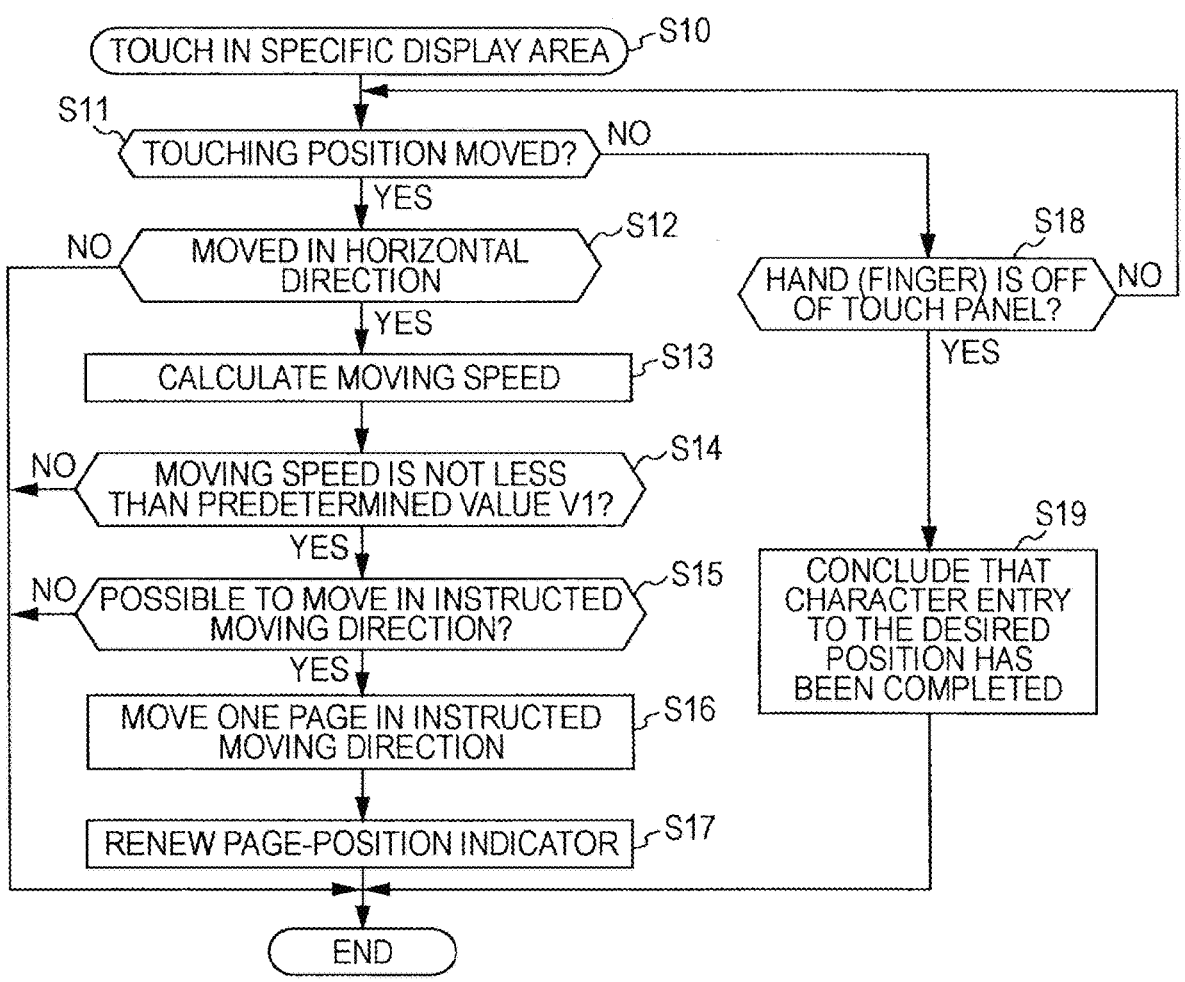
FIG. 6 is a flow chart illustrating an example of key-input processing according to an embodiment of the present invention.

FIG. 6 is a flow chart illustrating an example of key-input processing in the present embodiment. This processing can be realized by allowing the control section 100 to read and execute a program stored in the storage section 107 as shown in FIG. 2. The same may be also applied to the processing of any of other flow charts which will be described later.

The processing of FIG. 6 may be initiated by interruption to the CPU in response to a user's touch in the specific display region 330 (S10).

First, it is determined whether a touching position is moved (S11). In the determination of the presence of such a movement, for considering an error touching operation, any movement within a minute range from the touching position (for example, within several pixels) is not considered as a substantial movement.

If the hand (i.e., finger or fingers) is off of the touch panel while the touching position is not moved (Yes in S18), then it is concluded that the input of a key (character) corresponding to the touching position has been performed (S19). Consequently, the present processing is ended.

If it is concluded that the touching position is moved (YES in S11), then it is also determined whether the movement is performed in the longitudinal direction of the specific display region 330 (in this example, along the right-to-left direction thereof) (S12). This determination can be performed depending on whether the angle of an assumed line connecting between the start and the end of the movement with respect to the right-to-left direction is within a predetermined range. If it is concluded that the line is not along the right-to-left direction, then the process is ended.

If it is concluded that the line is along the right-to-left direction, then the process is ended, then a moving speed is calculated (S13). It is confirmed whether the moving speed exceeds a predetermined value V1 or more (S14). If it is less than the predetermined value V1, then it is determined that there is no predetermined flick operation. Thus, the process in ended. If it is not less than the predetermined value V1, then it is determined that there is the predetermined flick operation. Subsequently, it is further determined whether it is possible to perform a page-switching operation that allows a set of input candidate key groups in the specific display region 330 to be moved in the instructed moving direction along the touching (S15). If the end of the page is displayed and another page to be displayed is not present over the end thereof, then it is determined that the page switching is not available. Thus the process is ended.

If it is concluded that it is movable, then the keys are moved in the instructed moving direction (S16). The display of the page-position indicator 335 is renewed in response to the page switching (S17).

Figure 7:
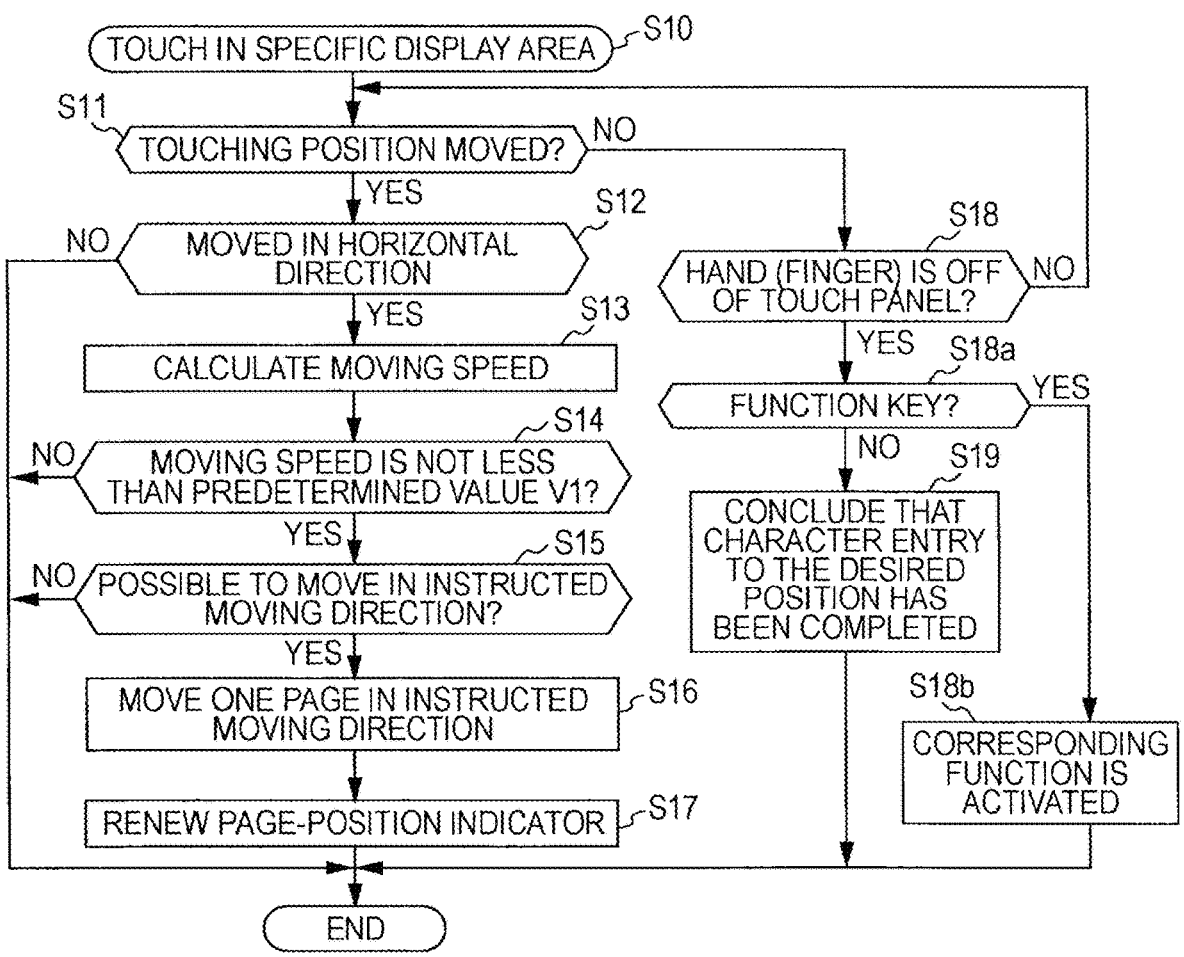
FIG. 7 is a flow chart illustrating a modified example of the processing in FIG. 6.

FIG. 7 is a diagram illustrating a modified example of the process shown in FIG. 6. The descriptions of the same steps as those of the process shown in FIG. 6 will be omitted because of being provided with the same reference numerals as those of FIG. 6. The process shown in FIG. 7 is provided for keys displayed in the specific display region 330, which also include functional keys, as described in (c1) to (c3) of FIG. 5C. In this case, the control section 100 has a task to initiate a function when it is instructed by touching of the corresponding key.

The process shown in FIG. 7 has the same steps as those of one shown in FIG. 6, except for the addition of Steps S18a and Sl8b after the step S18. The step 18a is a process step for determining whether the key is a function key or not when the user's hand is off of the touch panel. The step 18b is a processing step for initiating the function when the key is a function key.

Figure 8:
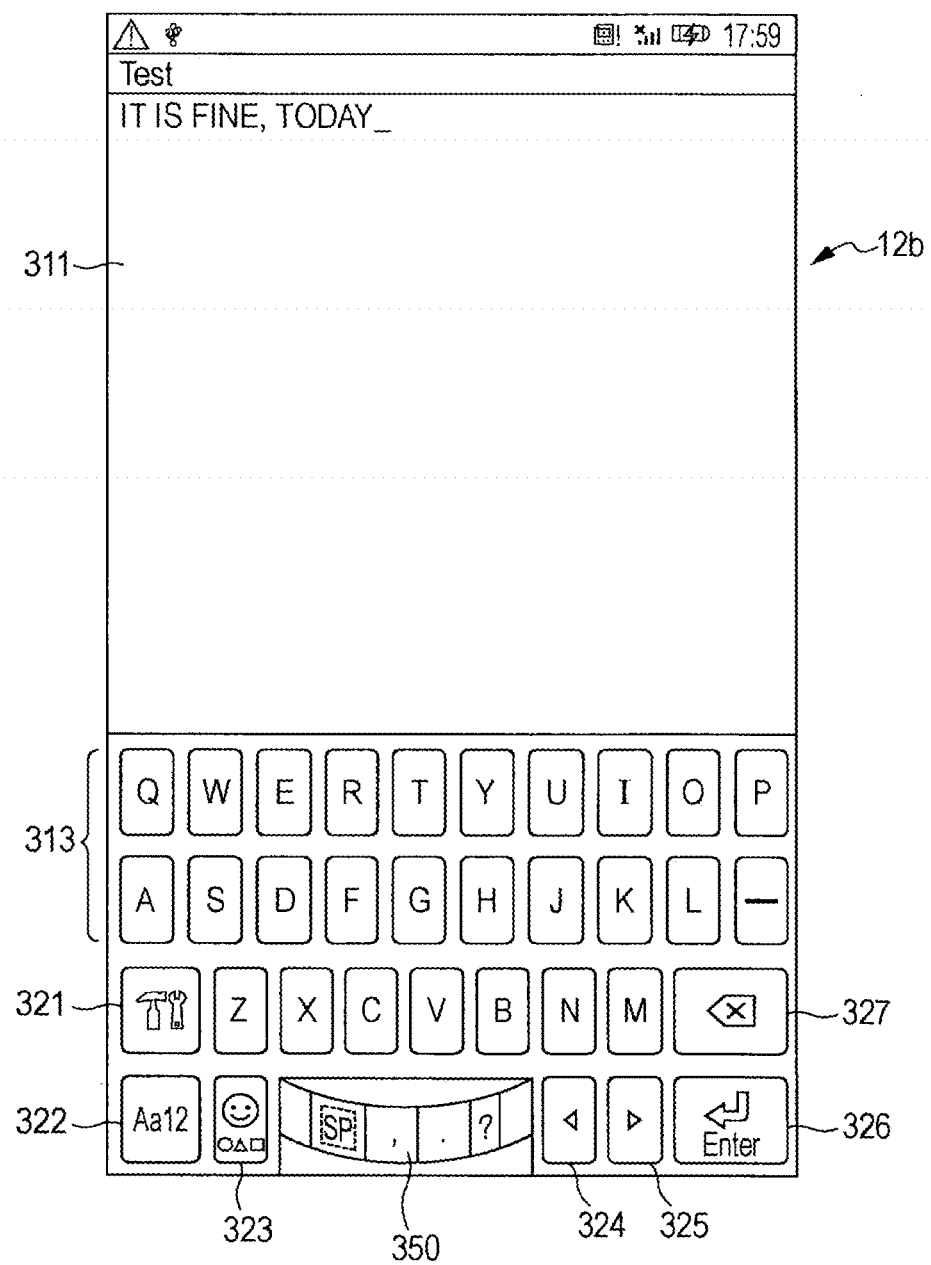
FIG. 8 is a diagram illustrating a display screen for key input as another example of the key input display screen according to the embodiment of the present invention.

Next, FIG. 8 is a diagram illustrating a display screen 12b for key-input as another example of the key-input display screen. The descriptions of the same components as those of the key-input display screen 12a shown in FIG. 3 will be omitted because of being provided with the same reference numerals as those of FIG. 3. The configuration of the display screen 12b shown in FIG. 8 is the same as one shown in FIG. 3, except for a specific display region 350 instead of the specific display region 330. In this example, the specific display region 350 is virtually displayed in the form of a cylindrical drum and keys are arranged on the curved surface of the cylinder. Part of the curved surface on which a plurality of keys is represented is exposed to the specific display region 350 and the drum can be rotated by the flick operation.

A set of input candidate key groups is virtually arranged in the form a ring around the periphery of the drum. The control section 100 switches pages one by one in response to the user's flick operation. One flick operation corresponds to the rotational movement, of the drum for one page. Several times of the flick operation leads to one rotation of the drum. There is no rotational end, so that two or more rotations can be continuously performs in the same direction. The number of times of flick operation for attaining one rotation (one turn) of the set of input candidate key groups can be determined by the number of keys included in one page as well as the number of keys in the set of input candidate key groups. In this example, the set of input candidate key groups corresponding to three pages is arranged on the periphery of the drum according to the example shown in FIG. 3. Therefore, three repetitive flick operations in the same direction allows all of the keys to be displayed once and four repetitive flick operation allows the set of input candidate key groups to be back where one started.

The page configuration illustrated in FIG. 5 is also applicable to the configuration of the specific display region 350 in FIG. 8. In addition, the number of pages may be two or more but not limited thereto. The number of keys per page is not limited to four. In the above examples, each page has the same number of keys and the same size of the key areas. Alternatively, the number of keys and the sizes of the key areas may be different depending on their assigned pages. Furthermore, the input candidate keys represented on the specific display region 350 may be automatically changed depending on the type of keys which is presently selected.

Unlike the specific display region 330 of FIG. 3, as described above, the specific display region 350 has no end of the page. The drum display is preferable because of its rotation in an endless manner. In addition, the endless rotation is free of a reference location. Thus, it is not necessary to display a page position indicator corresponding to the page switching.

Furthermore, a non-drum type display, such as the specific display region 330 of FIG. 3, may be modified to one capable of switching pages in an endless manner by connecting one end of the page to the other end thereof. Therefore, any embodiment of the present invention does not eliminate such a case.

Figure 9:
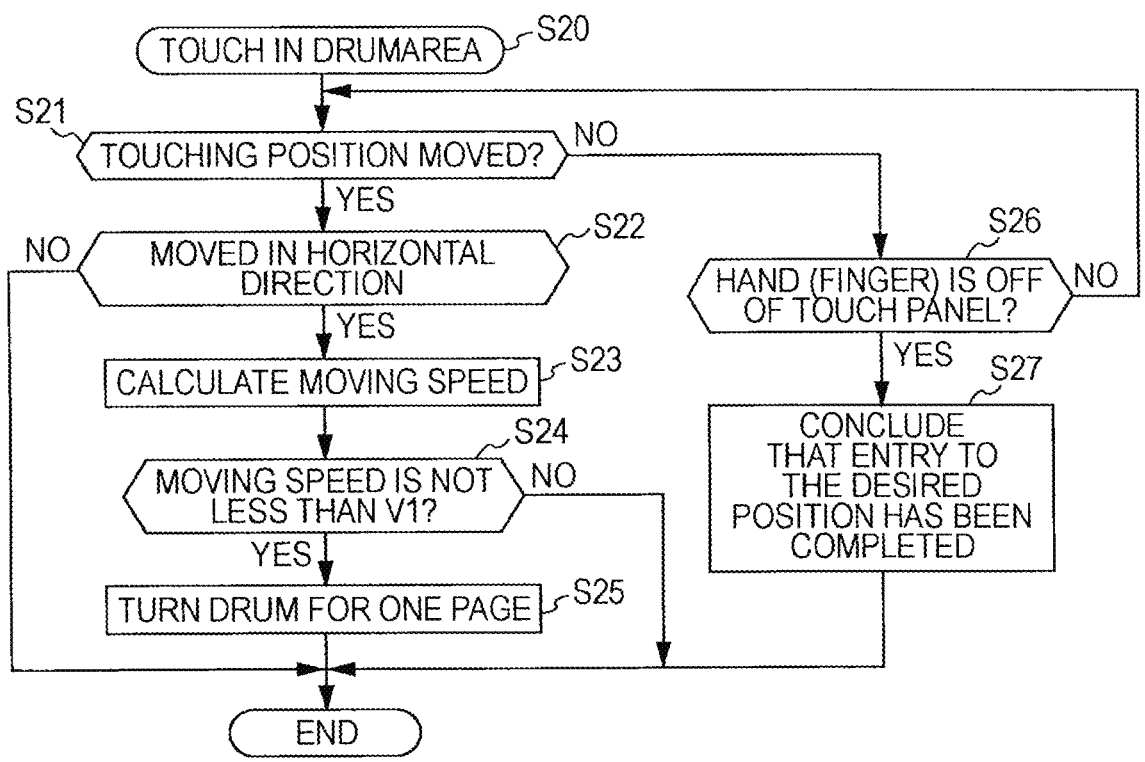
FIG. 9 is a flow chart illustrating an example of key-input processing for the key input display screen shown in FIG. 8.

FIG. 9 is a flow chart illustrating an example of key-input processing for the key-input display screen 12b shown in FIG. 8.

The processing of FIG. 9 may be initiated by interruption to the CPU in response to a user's touch in the specific display region 350 (S20).

First, it is confirmed whether a touching position is moved (S21). In the determination of the presence of such a movement, for considering an error touching operation, any movement within a minute range from the touching position (for example, within several pixels) is not considered as a substantial movement.

If the hand (i.e., finger or fingers) is off of the touch panel while the touching position is not moved (Yes in S26), then it is concluded that the input of a key corresponding to the touching position has been performed (S27). Consequently, the present processing is ended.

If it is concluded that the touching position is moved (YES in S21), then it is also determined whether the movement is performed in the longitudinal direction of the specific display region 350 (in this example, along the right-to-left direction thereof) (S22). This determination can be performed depending on whether the angle of an assumed line connecting between the start and the end of the movement with respect to the right-to-left direction is within a predetermined range. If it is concluded that the line is not along the right-to-left direction, then the process is ended.

If it is concluded that the line is along the right-to-left direction, then the process is ended, then a moving speed is calculated (S23). It is confirmed whether the moving speed exceeds a predetermined value V1 or more (S24). If it is less than the predetermined value V1, then it is determined that there is no predetermined flick operation. Thus, the process in ended. If it is not less than the predetermined value V1, then it is determined that there is the predetermined flick operation. Then, the drum is rotated by one page (S25). Therefore, a page-switching operation is performed so that a set of input candidate key groups in the specific display region 350 can be moved by one page in the instructed moving direction along the touching. Subsequently, the present processing is ended.

Furthermore, in the configuration of the display screen 12b, a key-basis movement (rotation) can be performed by an operation different from the above flick operation. For example, such an operation may be one that allows the touching position to be moved at a speed less than a predetermined speed to perform the key-based movement (rotation) (hereinafter, such an operation will be referred to a drag, operation). Therefore, the user is possible to define a desired position as a page break position.

Figure 10:
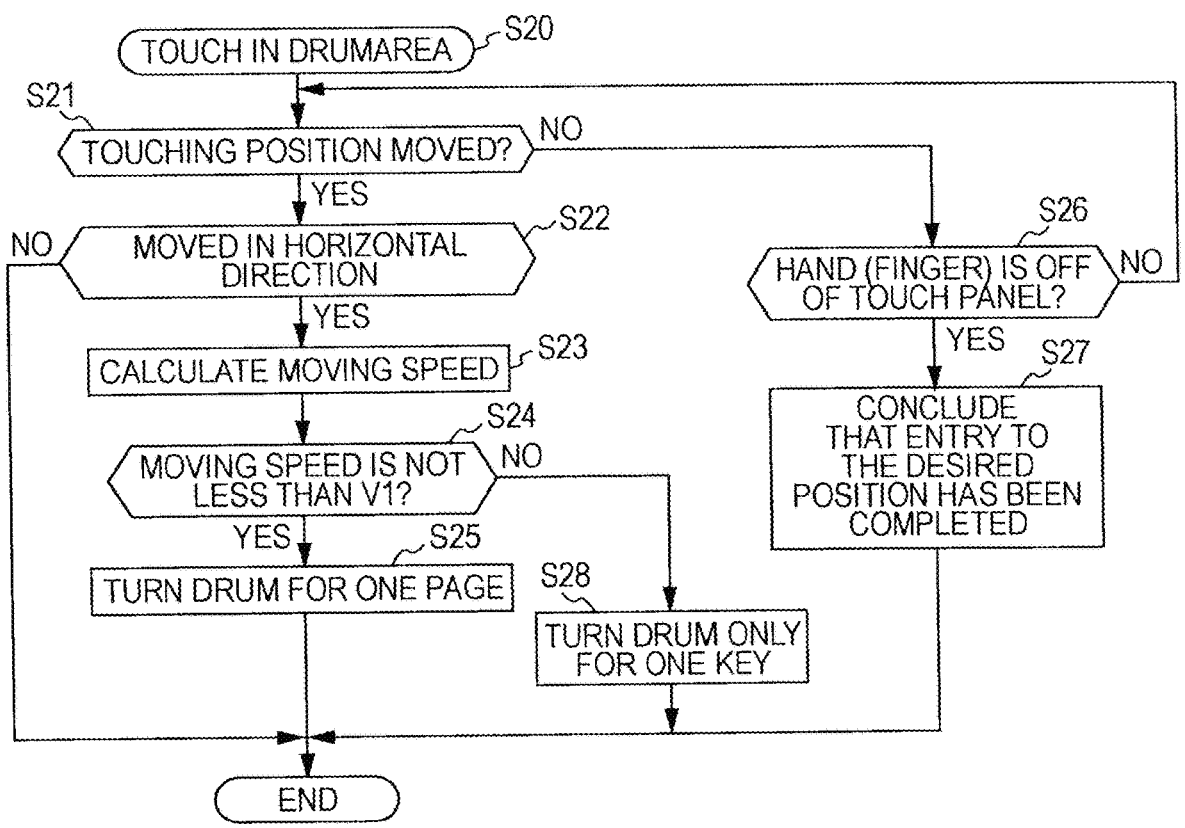
FIG. 10 is a flow chart illustrating a modified example of key-input processing according to the embodiment of the present invention.

FIG. 10 is a flow chart illustrating a modified example of key-input processing in the present embodiment. The descriptions of the same steps as those of the process shown in FIG. 9 will be omitted because of being provided with the same reference numerals as those of FIG. 9. The process shown in FIG. 10 has the same steps as those of one shown in FIG. 9, except for the addition of step S28 after the step S24. In the step S28, the drum is rotated by one key in response to a drag operation. The rotation of the drum by one key can change the boundaries between the adjacent pages at the time of subsequent page-switching operations. Alternatively, the rotation by one key may be temporal and the boundaries between the pages to be displayed when the pages are switched by flick operation can be constant.

Furthermore, even though any specific flow is not illustrated, the amount of the rotation may be changed within the number of keys per page depending on a moving distance attained by the drag operation. For example, the number of keys to be rotated (moved) may be defined depending on every moving distance, for example one key for the moving distance corresponding to a certain length x1, not more than two key for X2, and not more than three key for X3.

Figure 11:
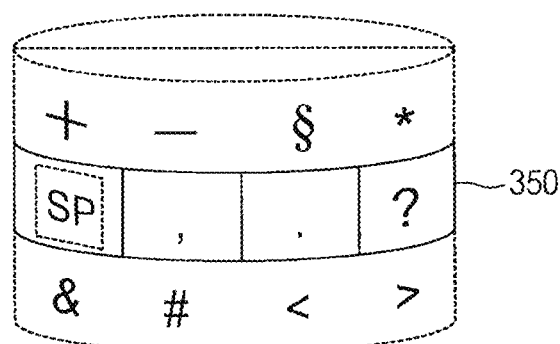
FIG. 11 is a diagram illustrating a modified example of the drum shown in FIG. 8.

FIG. 11 is a diagram illustrating a modified example of the drum shown in FIG. 8. The ring-shaped drum corresponding to a set of input candidate key groups assumed in the specific display region 350 shown in FIG. 8 is used as a single-stage drum in the vertical direction (rotational axis direction). In the example of FIG. 11, on the other hand, a drum has a plurality of stages (three stages in this figure) which are coaxially superimposed on one another in a virtual manner. In other wards, a drum with a plurality of stages stacked on one another is virtually prepared. Then, different sets of input candidate key groups are allocated to the respective stages of the drum. One of the plurality of stages is selectively exposed to the specific display region 350. In this case, the drum is rotated in response to a flick operation in the first direction (for example, the right-to-left direction). Then the stage of the drum is moved in response to a flick operation in the second direction perpendicular to the first direction.

Such a configuration of the drum leads to an increase in number of keys which can be displayed on the specific display region 350 as far as the input candidate key group on one input candidate groups on the respective ring-shaped stages are equal.

In this example, the number of stages is three but no limited to. It may be two or more. The vertical stacked stages includes end stages on the opposite sides, so that a stage-position indicator (not shown) representing the position of the stage presently displayed may be formed.

In addition during the movement of the stages, the opposite end stages may be connected to each other to allow the stages to be moved cyclically.

Figure 12:
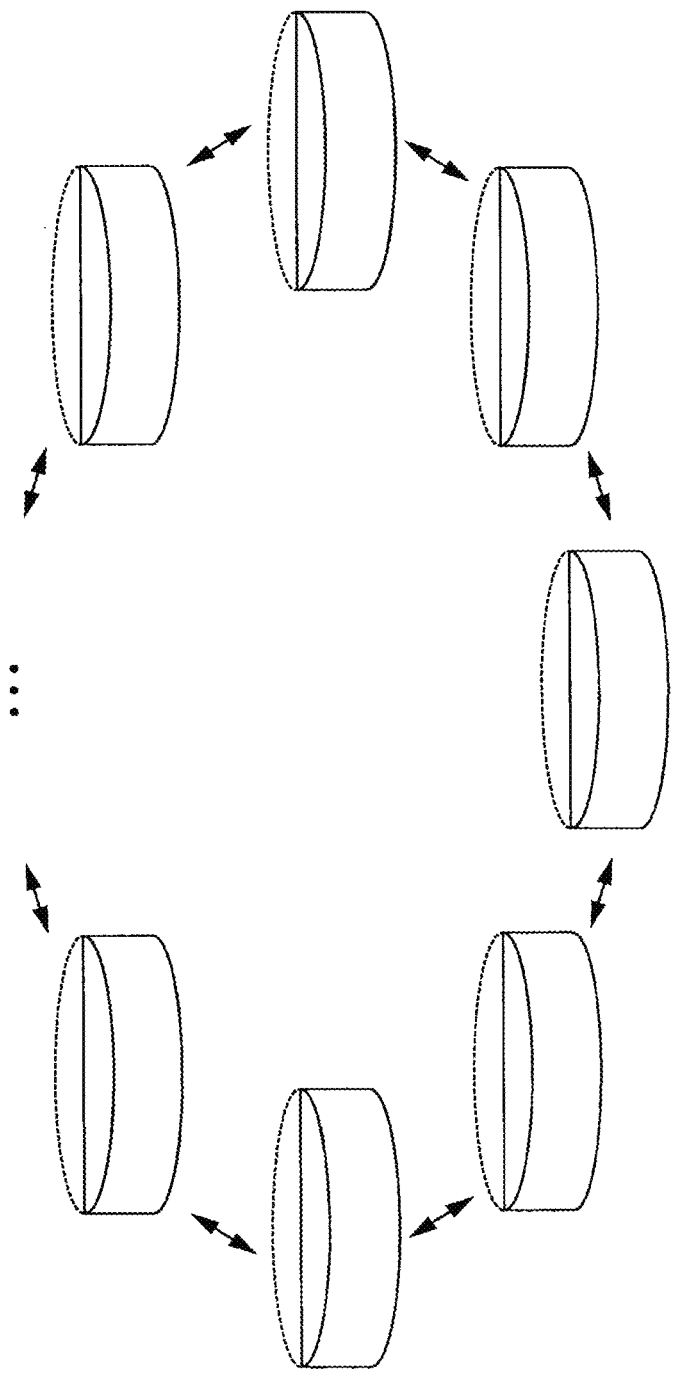
FIG. 12 is a diagram illustrating another modified example of the drum shown in FIG. 8.

FIG. 12 is a diagram illustrating another modified example of the drum according to FIG. 8. In this modified example, a plurality of drums having different rotation axes is prepared and one drum is then selected from them. This case assumes a plurality of drums makes a loop, or arranged in a ring shape. Furthermore, each drum shown in FIG. 12 may be of a multistage configuration, such as one described above, by coaxially adding one or more additional drums as shown in FIG. 11.

Figure 13:
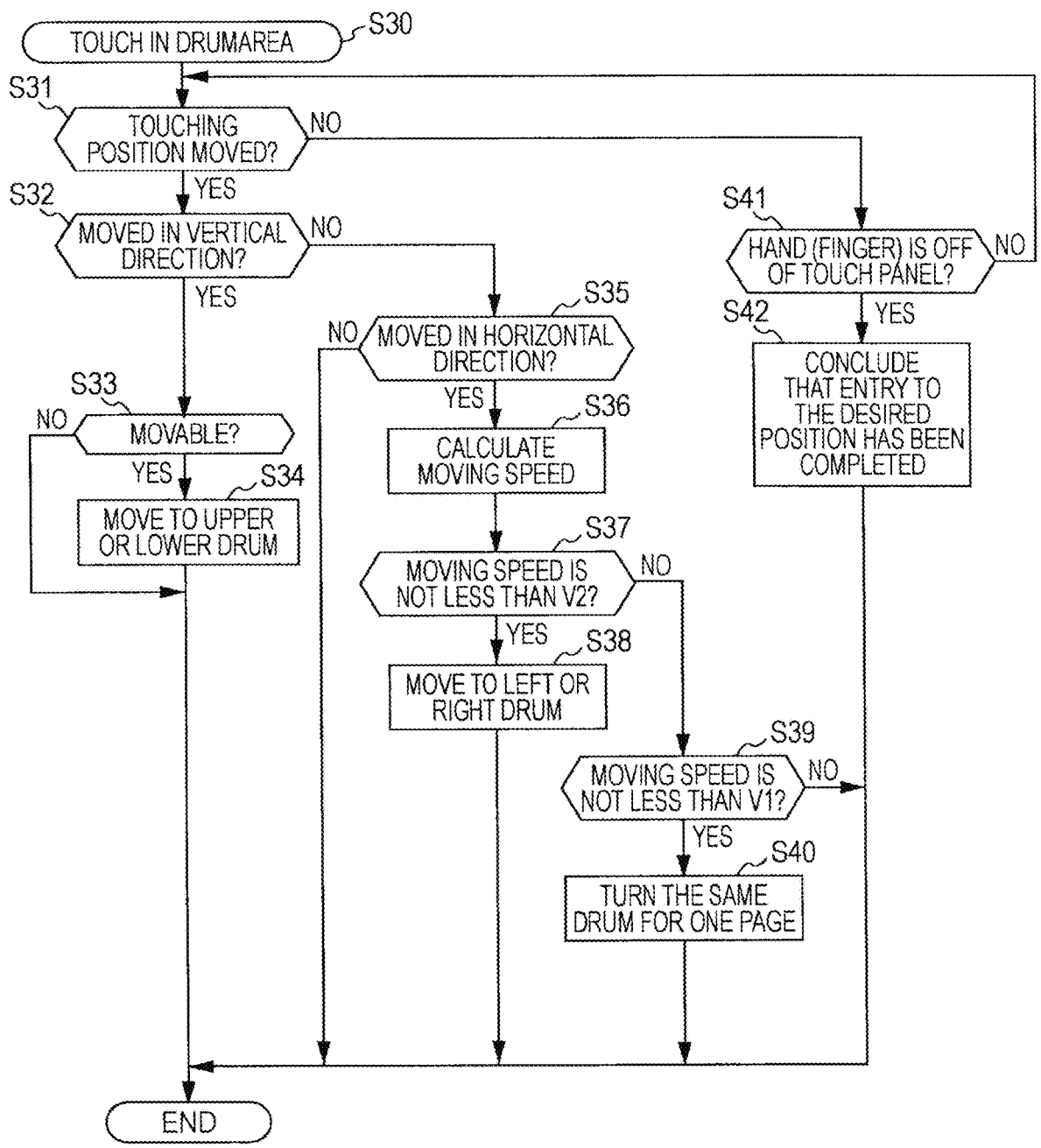
FIG. 13 is a flowchart representing an example of key-stroke processing corresponding to the configuration of the drum shown in each of FIG. 11 and FIG. 12.

FIG. 13 is a flowchart representing an example of key-stroke processing corresponding to the configuration of the drum shown in each of FIG. 11 and FIG. 12.

The processing of FIG. 13 may be initiated by interruption to the CPU in response to a user's touch in the specific display region 350 (S30). First, it is confirmed whether a touching position is moved (S31). In the determination of the presence of such a movement, for considering an error touching operation, any movement within a minute range from the touching position (for example, within several pixels) is not considered as a substantial movement.

If a hand (finger) separates from a touch panel while there was no movement of a touch position (S41, Yes), it is judged that an input of a key corresponding to the touch position was performed (S42). Consequently, the present processing is ended.

If it is concluded that the touching position is moved (YES in S31), then it is also determined whether the movement is performed in the vertical direction of the specific display region 350 (in this example, along the axial direction of the drum) (S32). This determination can be performed depending on whether the angle of an assumed line connecting between the start and the end of the movement with respect to the right-to-left direction is within a predetermined range.

If it is concluded that the movement is performed in the vertical direction, then it is determined whether it is movable to the instructed next drum in the vertical direction (S33). If it is possible, the touching position is moved to the upper or lower drum in response to the instruction (S34)) and the process is then ended.

If it is concluded that the touching position is not moved in the vertical direction in the step S32, then it is determined whether it is moved in the horizontal direction (S36). If it is concluded that the movement is not in the horizontal direction, then the process is ended.

If it is concluded that the line is along the right-to-left direction, then the process is ended, then a moving speed is calculated (S36). It is confirmed whether the moving speed exceeds a predetermined value V2 or more (S37). If the moving speed is less than the predetermined value V2, then it is confirmed whether the moving speed is not less than the predetermined value V1 (<V2) (S39). If the moving speed is less than V2, then it is confirmed that the first flick operation is performed and the same drum is then rotated by one page (S40). Therefore, a page-switching operation is performed so that a set of input candidate key groups in the specific display region 350 can be moved by one page in the instructed moving direction along the touching. If it is less than V1, then the process is ended.

In step S37 if the moving speed is more than the predetermined value V2, then it, is concluded that the movement is performed by the high-speed second flick operation but not by the first flick operation to move the touching position to the left or right drum (S38). Subsequently, the present processing is ended.

Figure 14:
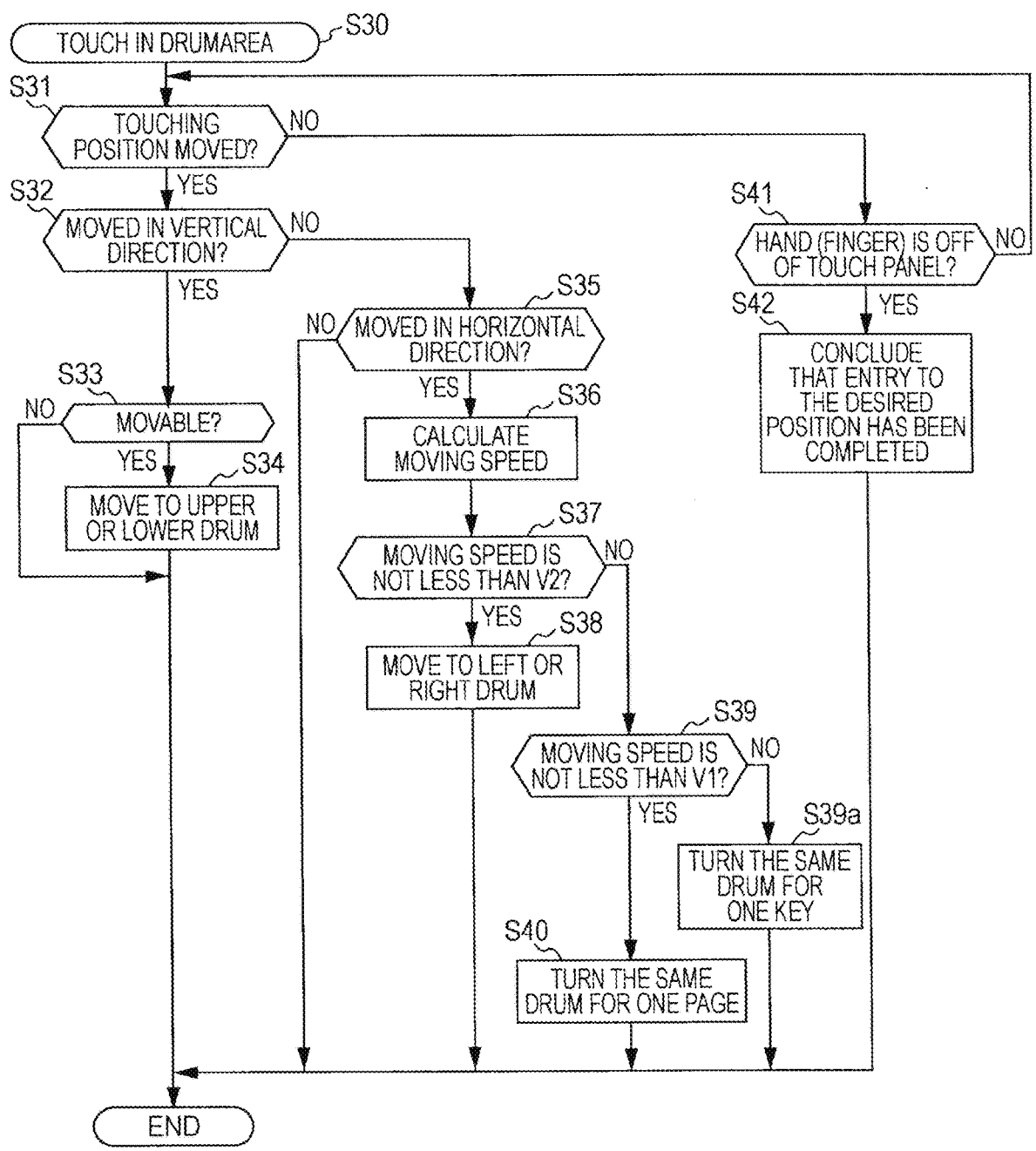
FIG. 14 is a flowchart representing a modified example of the process shown in FIG. 13.

FIG. 14 is a flowchart representing a modified example of the process shown in FIG. 13. The descriptions of the same steps as those of the process shown in FIG. 13 will be omitted because of being provided with the same reference numerals as those of FIG. 13. The process shown in FIG. 14 has the same steps as those of one shown in FIG. 13, except for an additional step 39a in which the drum is rotated by one key at a branching point of "NO" at the step S39 for determining whether the moving speed is not less than V1. Consequently, the boundary between the pages can be changed.

As explained above, according to the present embodiment, when entering a key which is not included in a software key board but comparatively high frequency in common use, a specific key of interest can be entered by a comparatively quick and simple operation, every time without updating the whole display of the software keyboard by switching an input mode or without displaying another list screen in addition to the software keyboard.

Next, a mobile terminal device according to a second embodiment of the present invention will be described. The mobile terminal device of the present invention has the same hardware configuration as one shown in FIG. 1 and FIG. 2. In the above first embodiment, the input candidate key groups are used for a plurality of pages to be displayed on the specific display region 330. In addition, both the page position (the positional relationship between the pages) and the specific-key position in the page are constant.

Figure 15A:
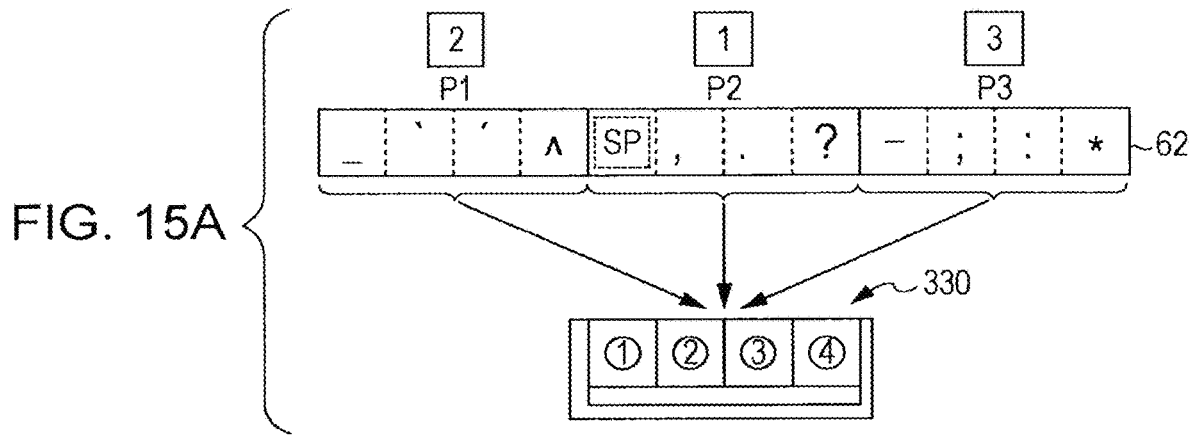
FIGS. 15A, 15B and 15C are diagrams illustrating an input display screen as an example of display screen for key input used in a mobile terminal device according to a second embodiment of the present invention.

In contrast, in the second embodiment, both the page position (the positional relationship between the pages) and the specific-key position in the page can be dynamically changed, while the input candidate key groups are used for a plurality of pages to be displayed on the specific display region 330. Therefore, at the time of selecting input candidate key groups, the results of the selection are successively studied to obtain the usage frequency of each input candidate and the usage frequency of each page. Furthermore, the page position and the key position in the page are changed in response to the obtained usage frequency. In addition, as shown in FIG. 15, the positions of pages P1, P2, and P3 of input candidate key groups 62 are variable with respect to one another. In three pages for the input candidate key groups 62, it is assumed that the page sandwiched between two pages is displayed on the specific display region 330 as an initial state. Then, the order of priorities of the page positions is previously determined so as to be represented by the respective boxed numbers in the figure in advance. In this example, the page with high usage frequency (page P2 in the example of FIG. 15A) is positioned in the center of the input candidate key groups 62. Next, the page with high usage frequency (page P1 in the example of FIG. 15A) is positioned on the left side of the input candidate key groups 62. Next, the page with high usage frequency (page P3 in the example of FIG. 15A) is positioned on the right side of the input candidate keys 62.

Figure 15B:
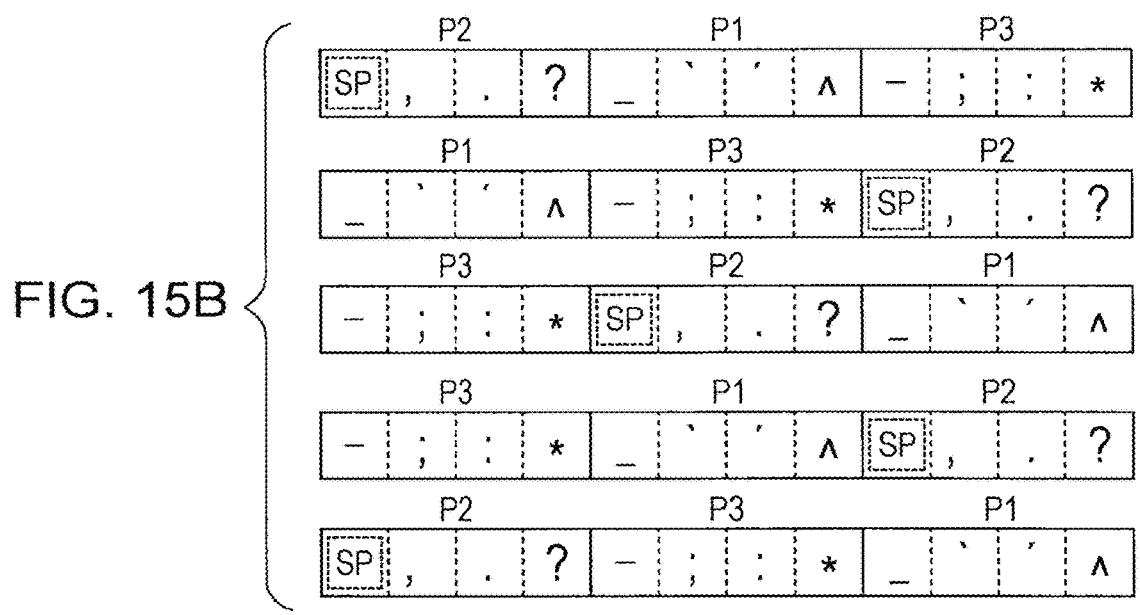

FIG. 15B illustrates an example of changes in page positions of the input candidate key groups 62. As shown in the present example, if the number of pages is three, the input candidate key groups 62 located on different page positions may be present in six ways.

Figure 15C:
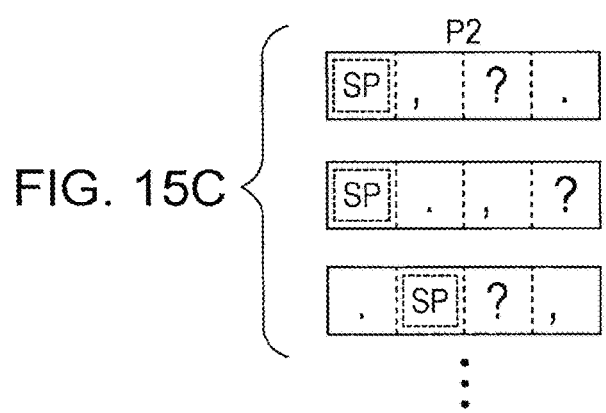

In addition, a priority level can be also attached to a key position in the page, like a circled number given to each key position in the specific display region 330 shown in FIG. 15A Therefore, depending on the usage frequency of each specific key, the key positions in the page can be varied. FIG. 15C illustrates a modified example of an in-page key sequence of the page P2. As shown in the present example, if the number of keys in page is four, 24 pages with different key positions can be present.

The priority levels of the respective page positions and the priority levels of the respective keys in the page are not limited to those described in the aforementioned example. A way of providing preferable priority levels may be changed depending on the user's dominant arm, preference, and the like. Thus, their priority orders may be variably set by the user.

Figure 16:
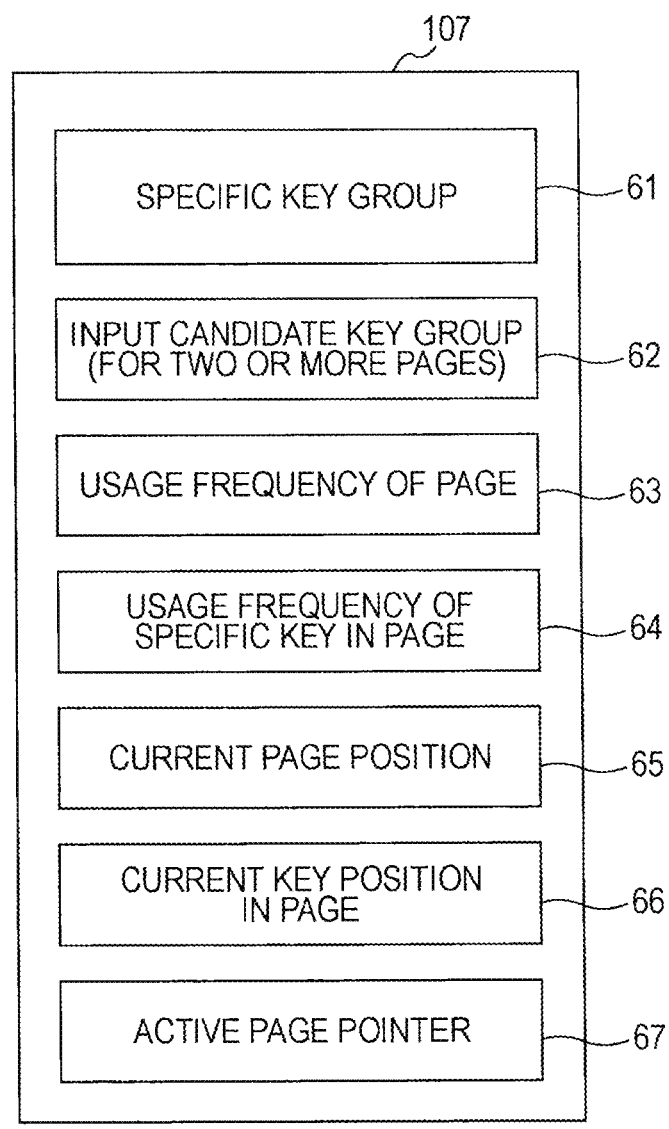
FIG. 16 is a diagram illustrating main data to be stored in a storage part according to the second embodiment of the present invention.

FIG. 16 illustrates the main data to be stored in the storage section 107 in the present embodiment. In other words, the storage section 107 stores various kinds of data for specific key group 61, input candidate key group 62, usage frequency 63 of page, usage frequency 64 of specific key in page, current page position 65, current key position in page 66, active page pointer 67, and the like.

The specific key group 61 includes all specific keys which can be used in the mobile terminal device 10 represented by the specific key list region 330 shown in FIG. 4. The data may be font data corresponding to a key code or the like. The input candidate key group 62 is a group of specific keys to be provided as input candidates for two or more pages to be displayed on the specific display region 330 and may be a subset of the specific key group 61. The usage frequency 63 of the page is data representing the usage frequency of each page. The usage frequency of the page can be calculated such that if any one of specific keys in one page is selected, then the page is deemed to be a used one. The usage frequency of a specific key in page 64 is data that represents the usage frequency of a specific key in each page. The current page position 65 is data that represents the current position of each page. In the above example, the current page position 65 is one of "middle", "left", and "right" (each corresponding to the numeral in square). The key position in the current page 66 is data that represents the position of a key in each page. Specifically, it represents a position with circled number corresponding to each of keys in the page. The active page pointer 67 is data that represents a page actually appeared in the specific display region 330. This data will be referred for the representation of the page position indicator as described above. Briefly, this data is page discrimination information (for example, P1, P2, or P3) for discriminating one page from the other.

Figure 17:
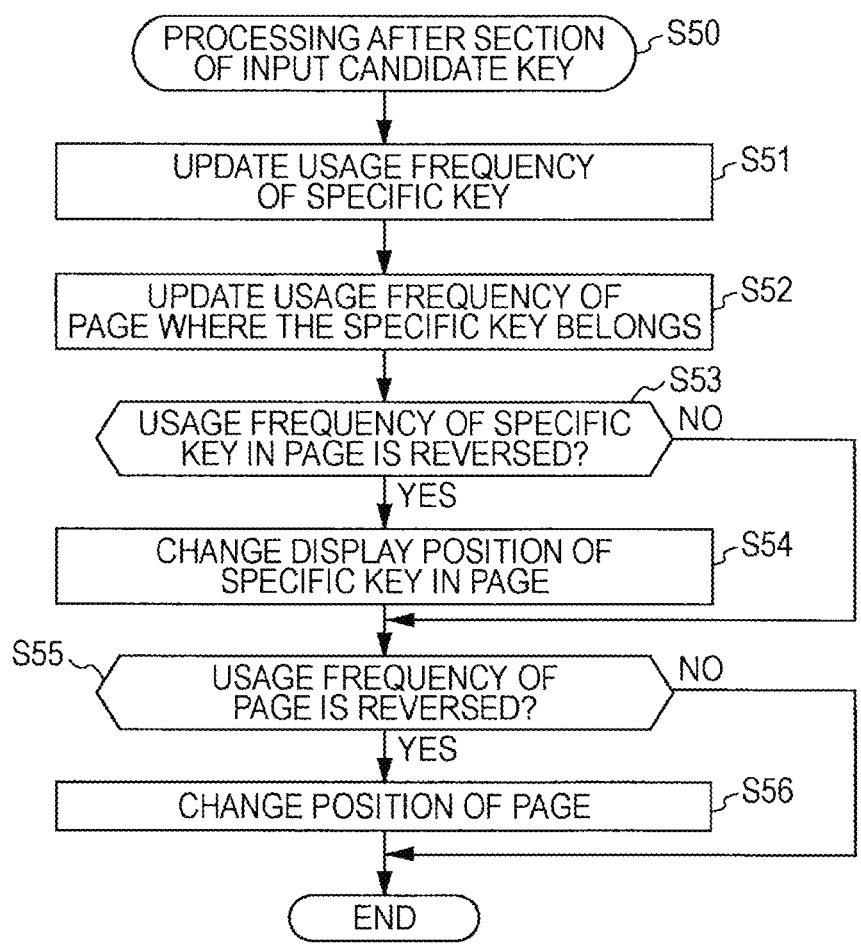
FIG. 17 is a flow chart of processing that describes the operation of the input device according to the second embodiment of the present embodiment.

FIG. 17 is a flow chart of processing, which describes the operation of the input device according to the present embodiment. In the figure, this processing is processing S50 which can be executed after the selection of an input candidate key. The processing S50 may not be executed after every time any input candidate key is selected. For example, after completing an application with entering of specific keys, the processing S50 in FIG. 17 may be collectively executed for all the keys.

First, the usage frequency of specific key is updated (S51). Subsequently, the usage frequency of page where the specific key belongs is updated (S52). Then, it is checked whether the usage frequency of specific key is revered (S53). The term "revered" means that, as a result of updating a certain specific key, the usage frequency of this specific key becomes higher than the current usage frequency of another specific key (input candidate key). In this case, the display position of such a specific key in the page is changed to another display position with higher priority level (S54).

Then, it is checked whether the usage frequency of page has been reversed (S55). In this case, likewise, the term "reversed" means that, as a result of updating a certain specific page, the usage frequency of the specific page becomes higher than the current usage frequency of another page. In such a case, the display position of the page is changed to another display position with higher priority level (S56).

Next, a modified example will be described for dynamically changing the page position and the specific key position in the page when icons representing the function keys corresponding to a plurality of pages are selectively displayed on the specific display region 330 as shown in (e1) to (e3) of FIG. 5.

Figure 18:
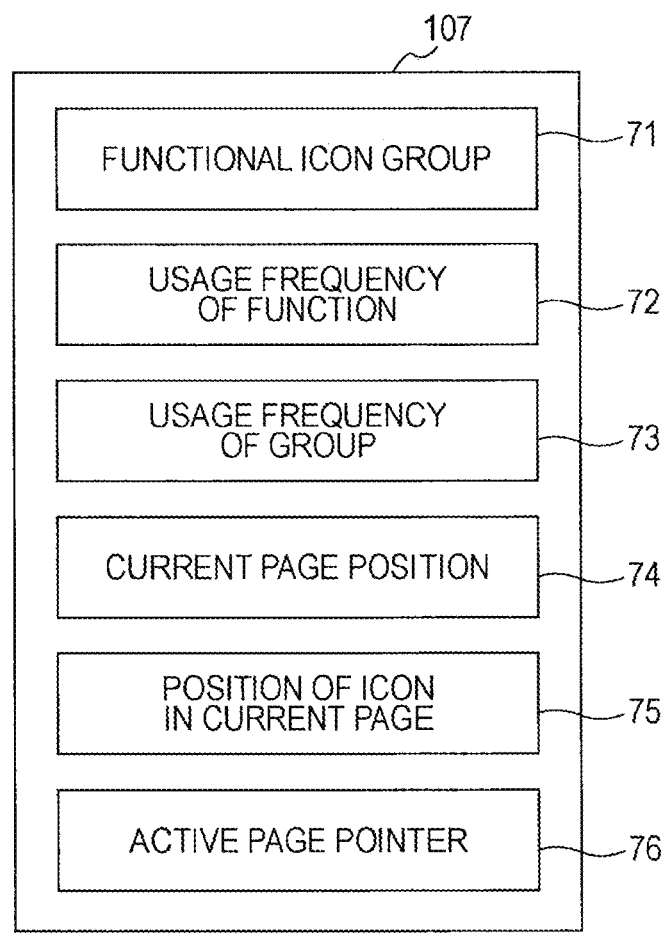
FIG. 18 is a diagram illustrating a modified example according to the second embodiment of the present invention.

FIG. 18 is a diagram illustrating main data to be stored in the storage section 107 in this exemplary modification. The storage section 107 includes functional icon group 71, usage frequency of function 72, a usage frequency of group 73, current page position 74, the position of icon in current page 75, active page pointer 76, and the like. The functional icon group 71 is a set of icon data that represents function keys for activating functions used in the mobile terminal device. Exemplary icons representing the respective function keys are illustrated in FIG. 19. In this example, 16 icons in total are divided into four groups depending on their corresponding functions. Group A is a message group relevant to exchanges of messages, for example a telephone application, a mailing application, an address book application, and a messenger application, Group B is a media group related to replay n or the like of various kinds of media, for example a music application, a movie application for video replay, a game application for playing games, and an on-segment broadcasting application for receiving/playing one-segment broadcasting.

Group C is a convenient functional group relevant to various kinds of convenient functions, for example a map application using a global positioning system (GPS), a weather application for weather forecasts, a schedule application for schedule management, and an web application for browsing the Web. Group D is an additional group including, for example, an initial-setting application, a data box, a camera application, and a calculator application.

If four icons of each group are included in one page, what is necessary is just to prepare four pages to make all the icons the selection candidates. The usage frequency of function 72 is data that represents the usage frequency of each function to be updated every time the function is activated. The activation of each function is not only the selection of the corresponding function key from the specific display region 330 on a key-input screen but also means the activation of such a function on another screen, such as a standby screen or an operation menu screen. In other words, any function activated via any screen can be counted as one being used. The usage frequency of group 73 is data showing usage frequency for every group where the function belongs. The current page position 74, the position of icon in current page 75, and the active page pointer 76 are the same as the current page position 65, the present key position in the page 66, and the active page pointer 66 shown in FIG. 16, respectively.

Figure 20:
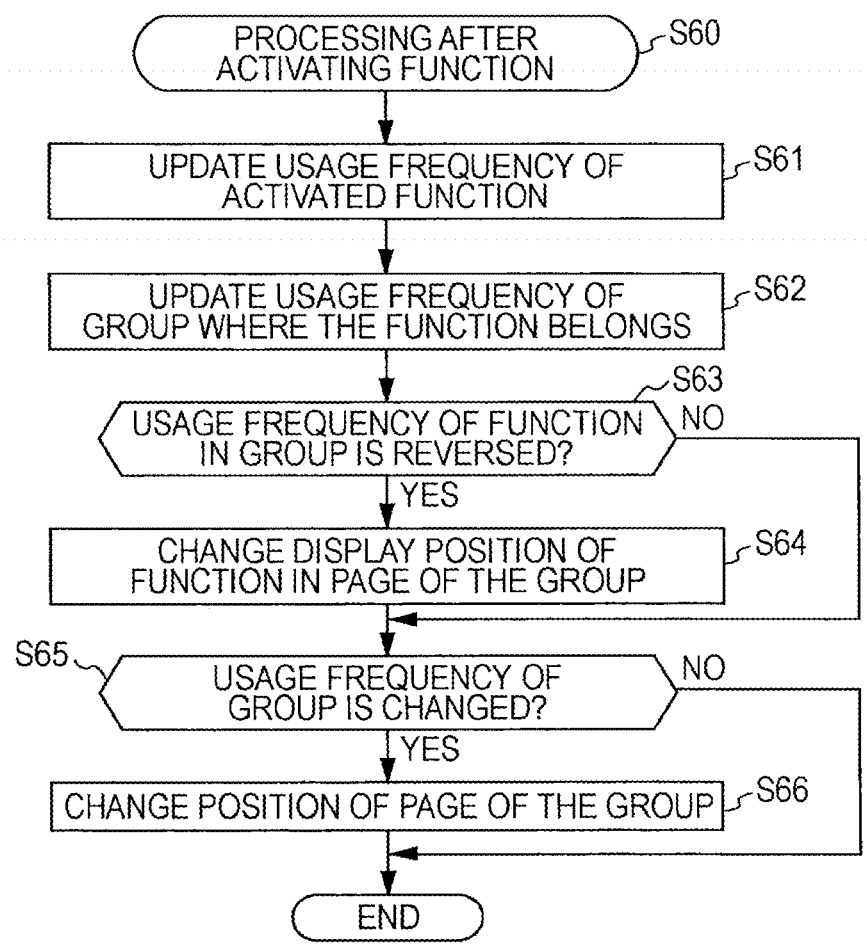
FIG. 20 illustrates a flow chart showing processing after functional activation corresponding to the modified example shown in FIG. 18.

FIG. 20 illustrates a flow chart showing processing S60 after functional activation that corresponds to the modified example shown in FIG. 18.

First, the usage frequency of the activated function is updated (S61). Next, the usage frequency of group (page) belonging to the function is updated (S62). Then, it is confirmed whether the usage frequency of the function in the group has been reversed (S63). The term "revered" means that, as a result of updating a certain function, the usage frequency of this function becomes higher than the current usage frequency of another function. In this case, the display position of such a function in the group is changed to another display position with higher priority level (S64).

Subsequently, it is confirmed whether the usage frequency of the group is reversed (S65). The term "revered" means that, as a result of updating a certain specific group, the usage frequency of this specific group becomes higher than the current usage frequency of another group. In such a case, the group's display position is changed to a display position of higher priority level (S66).

Figure 21:
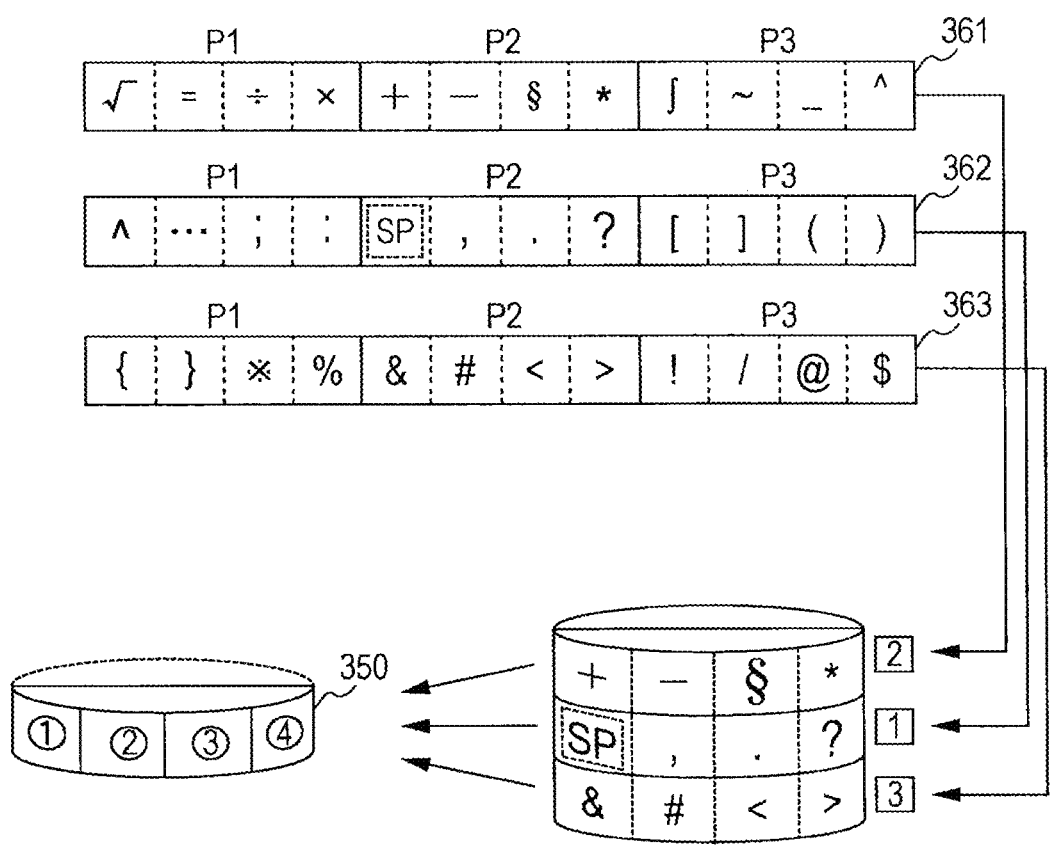
FIG. 21 is a diagram illustrating another modified example of a drum-shaped specific display region like the one shown in FIG. 8, where a drum position for input candidate key group for each of a plurality of drums displayed on this region, a page position in the drum, and a key position in the page are dynamically changed.

FIG. 21 is a diagram illustrating another modified example of a drum-shaped specific display region 350 like the one shown in FIG. 8. In this example, a drum position for input candidate key group for each of a plurality of drums displayed on this region 350, a page position in the drum, and a key position in the page are dynamically changed.

For the drum-shaped specific display region 350, as shown in FIG. 21, two or more input candidate key groups, three groups 361, 362, and 363 in this example, are prepared and superimposed in the form of a drum (hereinafter, also referred to as a "drum" for convenience). One of the input candidate key groups 361, 362, and 363, which corresponds one page, can be displayed on the specific display region 350. The priority level of each drum (input candidate key group) is previously determined and represented by a boxed number in the figure. In this example, as an initial state, it is assumed that the middle input candidate key group 362 will be selected as one to be displayed on the specific display region 350. Then, the middle stage of the drum is a drum position of the highest priority level. Furthermore, a flick operation is generally considered such that the flick operation in the upward movement can be easier than one in the downward movement. The upper drum position, which is selected by a flick operation from the middle input candidate key group 362 to the lower state in the initial state, is regarded as one having the second highest priority level. Furthermore, the lower drum position is regarded one having the third highest priority level. Therefore, an example of the input candidate group with the highest usage frequency, the input candidate key group 362 in the example shown in FIG. 15A, is brought into the middle stage. The input candidate key group with the next highest usage frequency (input candidate key group 361 in the example shown in FIG. 15A) is brought into the upper stage. The input candidate key group with the third highest usage frequency (input candidate key group 363 in the example shown in FIG. 15A) is brought into the lower stage. The user can select either of input candidate key groups 361, 362, and 363 by the flip operation in the vertical direction.

In the initial state, the selected input candidate key group is displayed by its predetermined page on the specific display region 350. The page position on the drum can be provided with its priority level in a manner similar to one described above. At the time of displaying the specific display region 350, the current page of the highest priority level on the middle stage of the drum can be displayed. The user can change one page to another by the flip operation in the horizontal direction.

The key position in each page is provided with a priority level with a circled number as described above. The key position in the page can be changed depending on the usage frequency of the specific key in the page.

Figure 22:
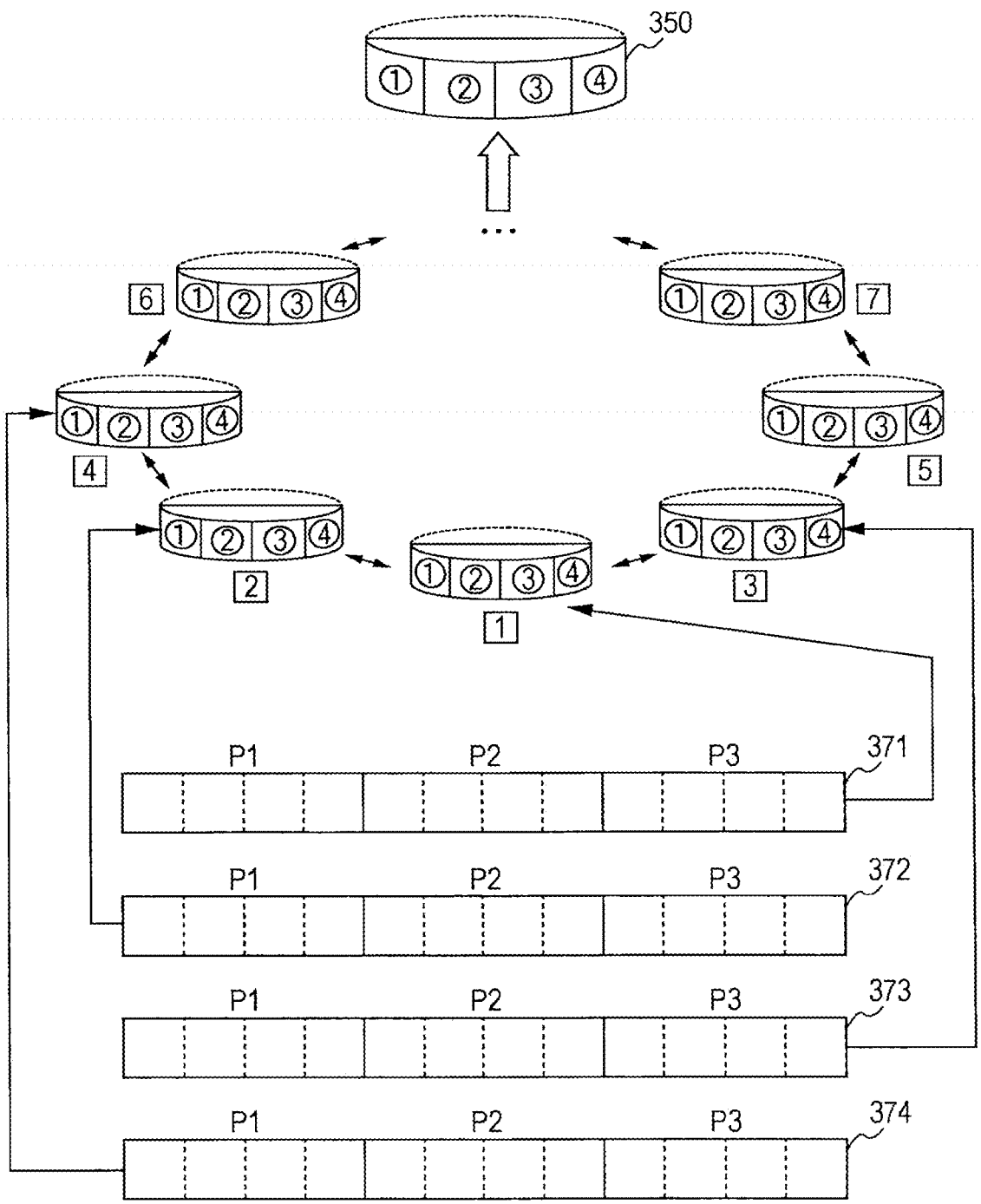
FIG. 22 is a diagram illustrating the specific display region in which a plurality of drums (input candidate groups) are arranged to form a ring and is provided for describing a dynamic change in priority level of the drum position, a dynamic change in drum position, a dynamic change in page position in the drum, and a dynamic change in position of the specific key in the page when displaying in the specific display region.

FIG. 22 is a diagram illustrating the specific display region 350 in which a plurality of drums (input candidate groups) are virtually distributed and arranged to form a ring. FIG. 22 is provided for describing a dynamic change in priority level of the drum position, a dynamic change in drum position, a dynamic change in page position in the drum, and a dynamic change in position of the specific key in the page when selectively displaying one drum in the specific display region 350.

The priority level of an initial drum position is previously determined and represented by a boxed number in the figure. In the case of the example shown in the figure, the drum (input candidate key group) located at a position is initially selected and then indicated by the boxed number 1. A box with a second priority level is represented by the boxed number 2 and located on the left of the drum represented by the boxed number 1 and a box with a third priority level is represented by the boxed number 3 is on the right thereof. In this way, the drum near one initially selected is provided with a higher priority level. This is because such a drum can be accessed by a smaller number of flip operations. The priority level of the drum in the horizontal direction is the same as one in the case of the non-drum type as described above.

Figure 23:
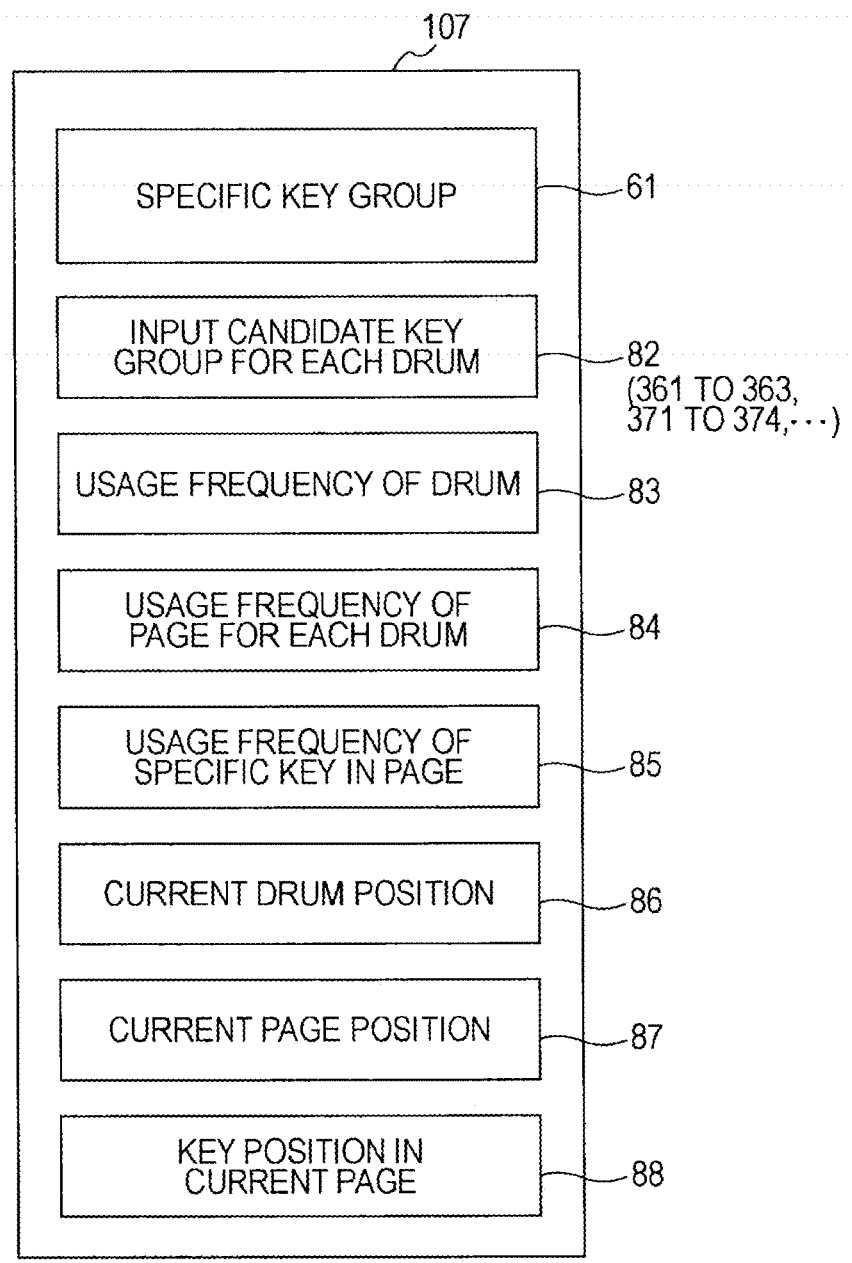
FIG. 23 is a diagram illustrating the main data stored in the storage section, which is common to FIG. 21 and FIG. 22.

FIG. 23 is a diagram illustrating the main data stored in the storage section 107, which is common to FIG. 21 and FIG. 22. That is, the storage section 107 includes an input candidate group 82 for each drum, usage frequency of drum 83, a usage frequency of page for every drum 84, a usage frequency of specific key in page 85, a current drum position 86, current page position 87, and a key position in current page 88.

As described above, the specific key group 61 includes all the specific keys which can be used in the mobile terminal device 10, such as those represented in the specific key list region 330. The input candidate key group 82 for each drum is a group of specific keys to be provided as input candidates for two or more pages to be displayed on the specific display region 330 and may be a subset of specific key groups 61. These keys correspond to input candidate keys 361-363, 371-374, and so on of FIG. 21 and FIG. 22 as described above. The usage frequency 83 of the drum is data representing the usage frequency of each drum. The usage frequency 84 of the page for each drum is data representing the usage frequency of each page for each drum. The usage frequency of a specific key in page 85 is data that represents the usage frequency of a specific key in each page. The current drum position 86 represents the position of the drum currently displayed on the specific display region 350. The current page position 87 is data that represents the current position of each page in the drum. Like the above example, the current page position 65 is one of "middle", "left", and "right" (each corresponding to the numeral in square). The key position in the current page 88 is data that represents the position of a key in each page. Specifically, it represents a position with circled number corresponding to each of keys in the page.

Figure 24:
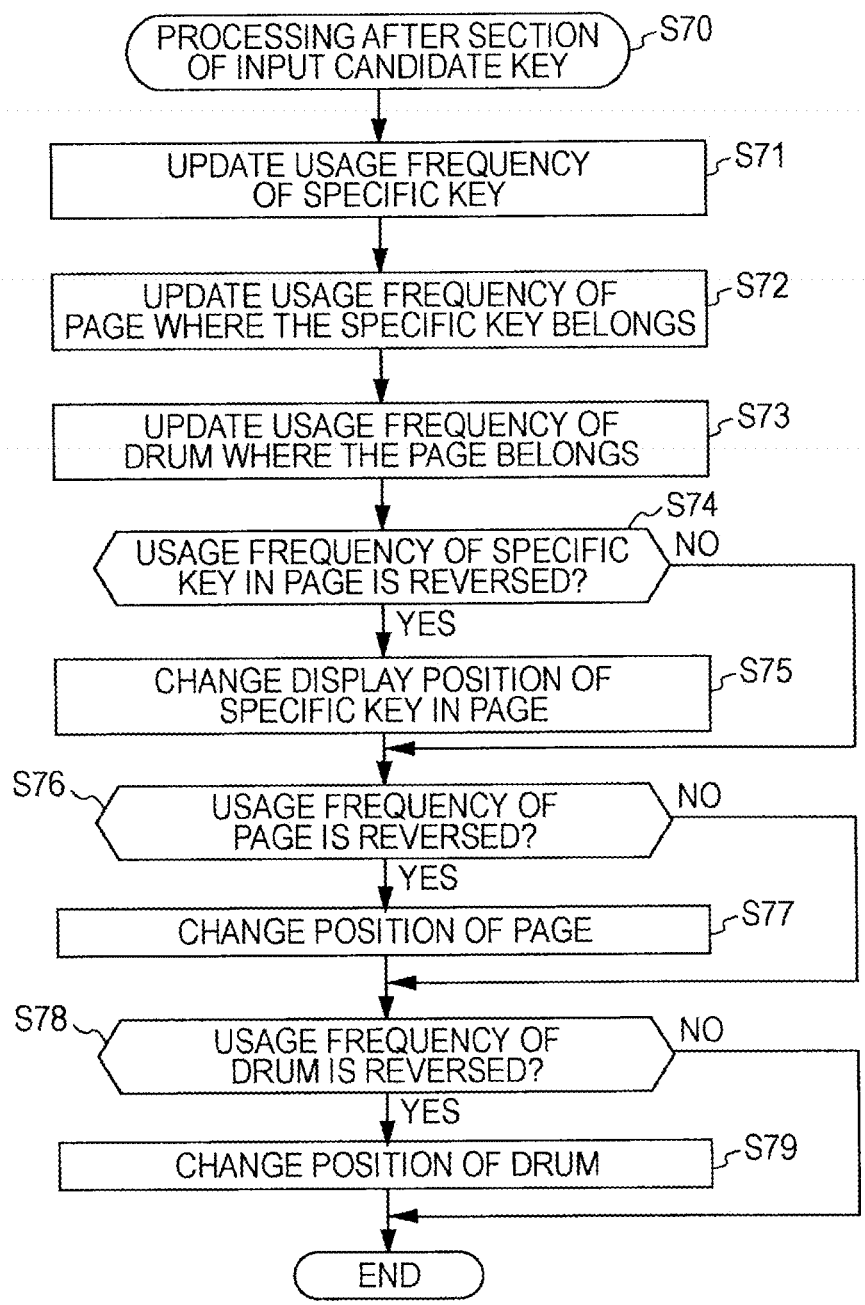
FIG. 24 is a flow chart that represents the processing after the selection of input candidate key as described in FIG. 21 and FIG. 22.

FIG. 24 is a flow chart that represents the processing S70 after the selection of input candidate key as described in FIG. 21 and FIG. 22.

In the figure, this processing is processing S70 which can be executed after the selection of an input candidate key. The processing S70 may not be executed after every time any input candidate key is selected. For example, after completing an application with entering of specific keys, the processing S70 in FIG. 24 may be collectively executed for all the keys.

First, the usage frequency of specific key is updated (S21). Subsequently, the usage frequency of page where the specific key belongs is updated (S72). Subsequently, the usage frequency of page where the specific key belongs is updated (S73). Then, it is checked whether the usage frequency of specific key is revered (S74). If the reversion occurs, the display position of such a specific key in the page is changed to another display position with higher priority level (S75).

Subsequently, it is confirmed whether the usage frequency of the page is reversed (S76). In the case of such reversion, the display position of the page is changed to another display position with higher priority level (S77).

Subsequently, it is confirmed whether the usage frequency of the drum is reversed (S78). In the case of such reversion, the drum position is changed to another display position with higher priority level (S79).

Next, a mobile terminal device according to a third embodiment of the present invention will be described, where an input candidate key group is automatically updated on the base of the usage frequency obtained by learning the status of using by the user. The mobile terminal device of the present invention has the same hardware configuration as one shown in FIG. 1 and FIG. 2.

In this case, the control section 100 has a function of displaying a list of specific key group, such as the specific key list region 340 of FIG. 4, a function of learning the usage frequency of each specific key, and a function of replacing keys in a set of input candidate key groups by using the usage frequency. The specific keys used as targets where the use frequencies thereof can be determined in the present embodiment include those not included in the input candidate key group.

Figure 25:
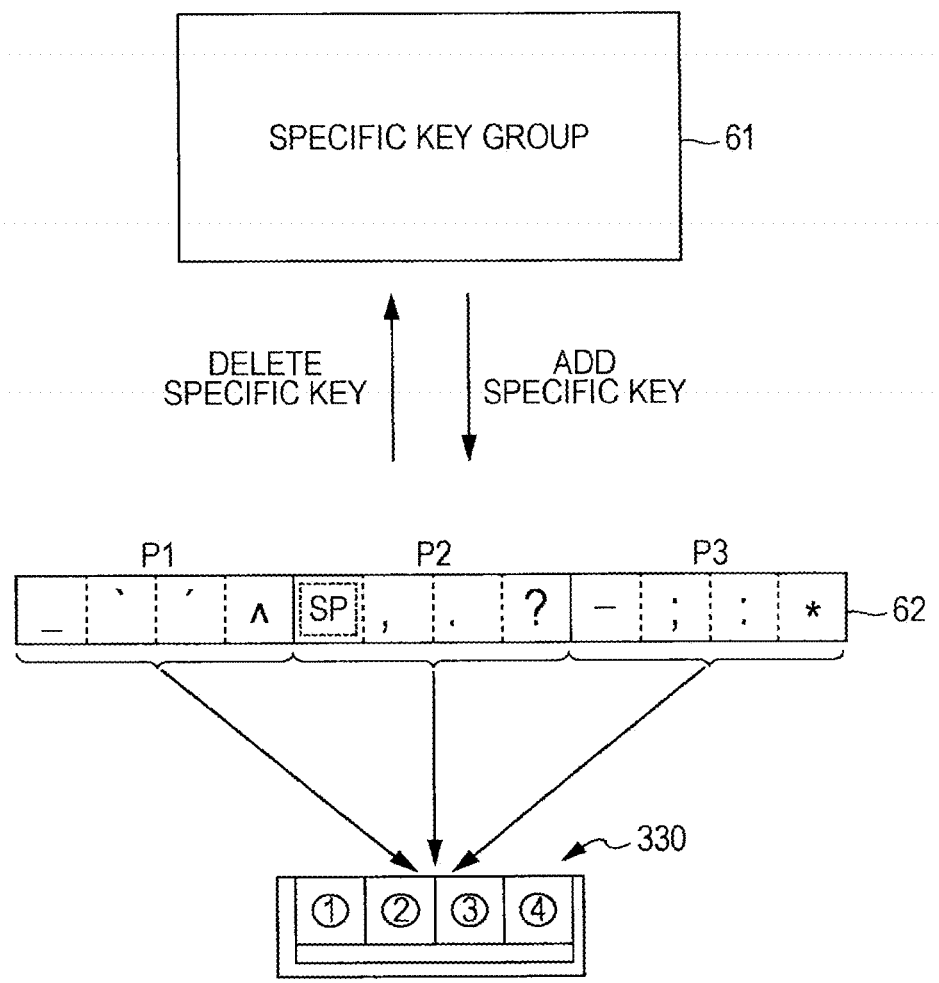
FIG. 25 is a diagram illustrating an example of a key input used in a mobile terminal device according to a third embodiment of the present invention.

FIG. 25 illustrates an example of replacing a specific key in the input candidate key group 62 shown in FIG. 15 with a specific key in the specific key group 61 based on the usage frequency of the former. If the usage frequency of the specific key present in the specific key group 61 but not present in the input candidate key group 62 is higher than the lowest usage frequency of the specific key in the input candidate key group 62, the specific key of the lowest usage frequency is deleted from the input candidate key group 62 and, instead, the corresponding specific key in the specific key group 61 is added to the input candidate key group 62.

Figure 26:
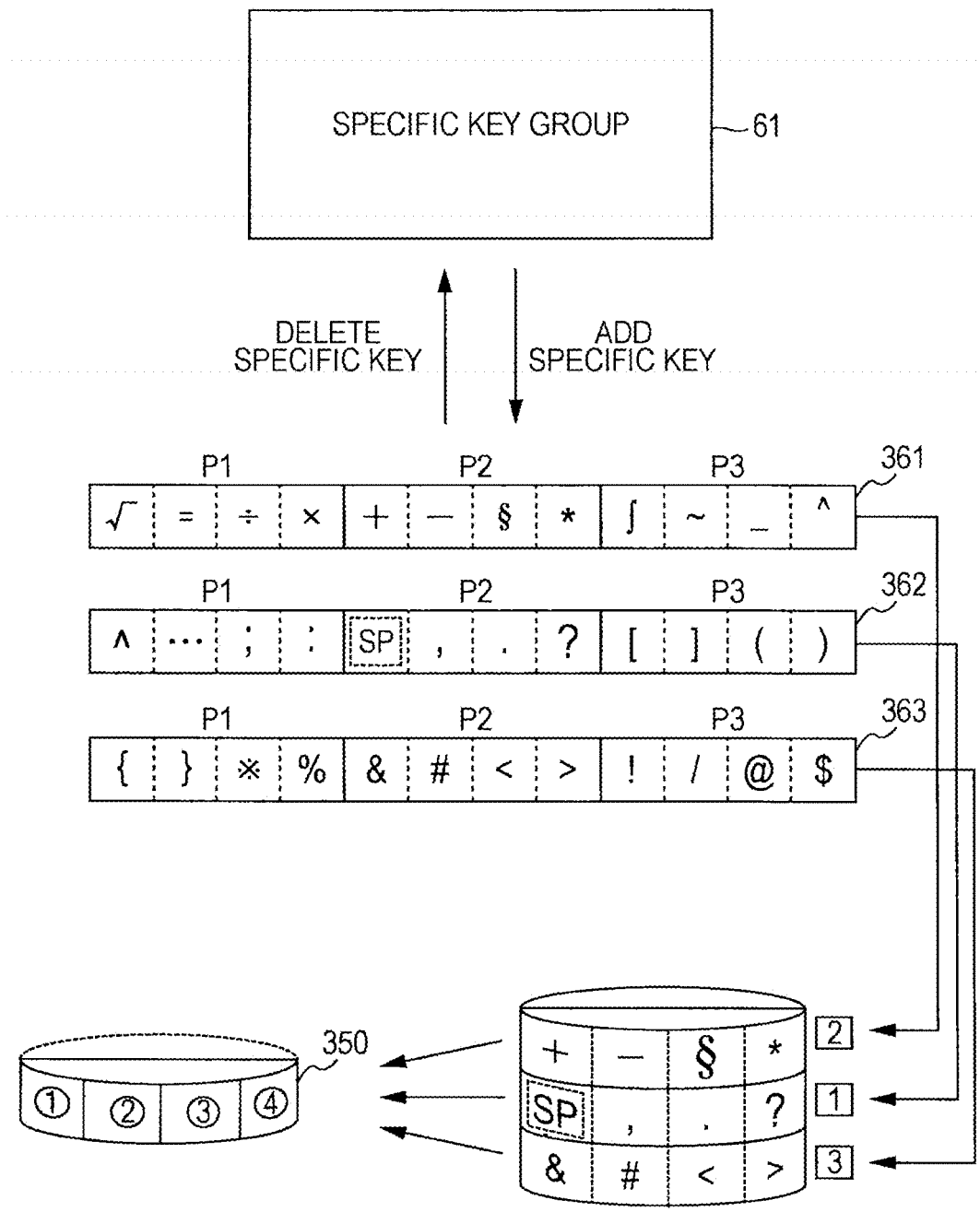
FIG. 26 is a diagram illustrating a modified example of the third embodiment of the present invention.

FIG. 26 is a diagram illustrating a modified example of the third embodiment, where a specific key in any of the input candidate key groups 361 to 363 shown in FIG. 21 is replaced with a specific key in the specific key group 61 based on the usage frequency of the former. In this example, comparing with the example shown in FIG. 25, a more number of input candidate key groups is used. However, operations of removing and adding a specific key are similar to those illustrated in FIG. 25.

Figure 27:
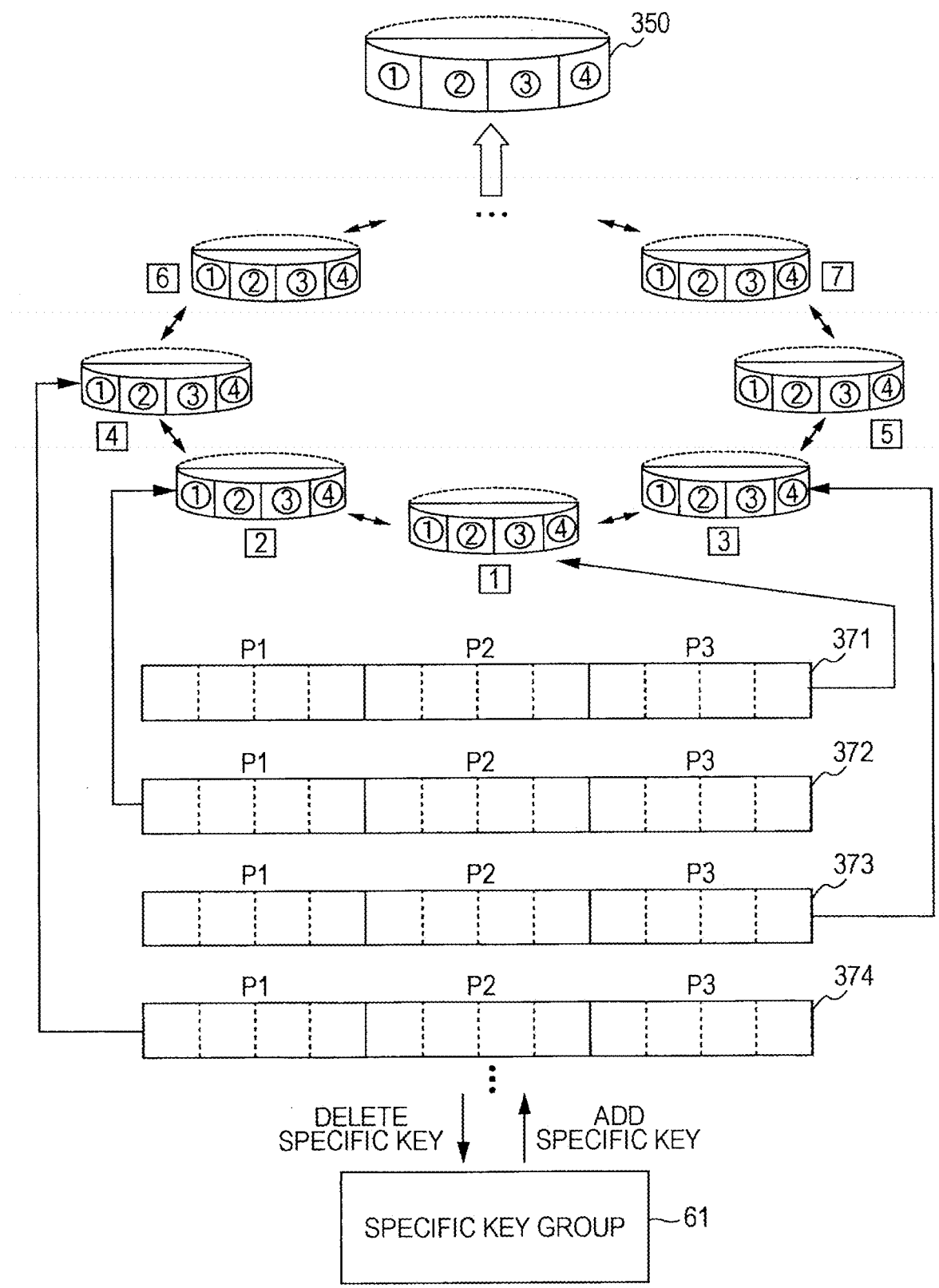
FIG. 27 is a diagram illustrating another modified example of the third embodiment of the present invention.

FIG. 27 is a diagram illustrating a modified example of the third embodiment, where a specific key in any of the input candidate key groups 371 to 374 shown in FIG. 22 is replaced with a specific key in the specific key group 61 based on the usage frequency of the former. In this example, comparing with the example shown in FIG. 26, a more number of input candidate key groups is used. However, operations of removing and adding a specific key are similar to those illustrated in FIG. 25 and FIG. 26.

FIG. 28 is a flow chart of processing relevant to the learning in the third embodiment.

Figure 28A:
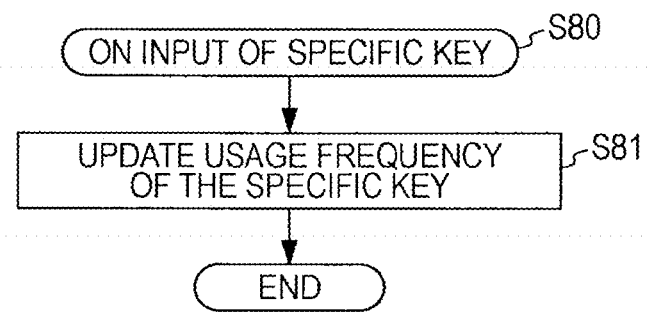
FIGS. 28A and 28B are flow charts of processing relevant to the learning in the third embodiment.

FIG. 28A is a diagram illustrating processing S80 activated when the specific key is entered. At the time of entering a specific key, the frequency of using the specific key is calculated ant the usage frequency data 107b is then updated (S81). The specific key may be entered from the specific key list region 340 or from the specific display region 330.

Figure 28B:
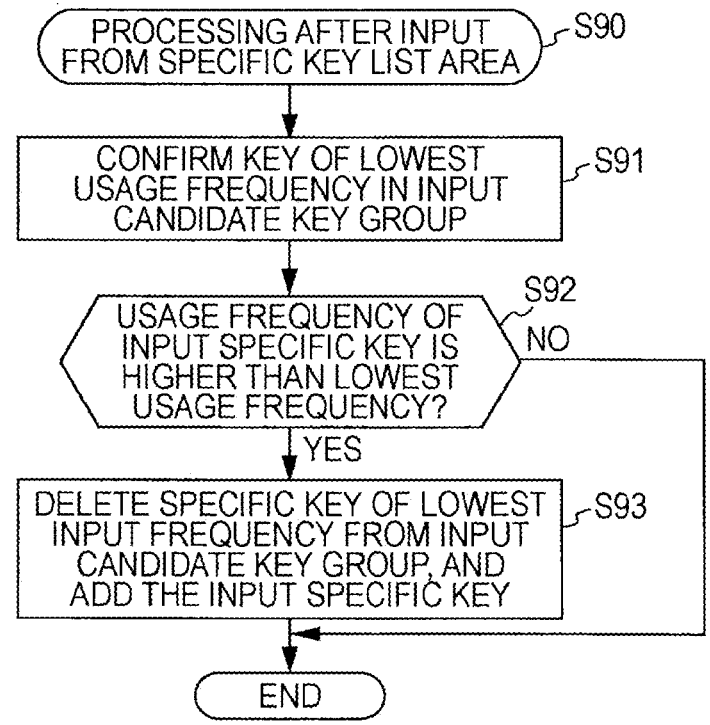

FIG. 28B is a diagram illustrating processing performed after input of a key from the specific key list region 340. First, among the current input candidate keys, a key with the least usage frequency is confirmed (S91). Subsequently, it is confirmed whether the usage frequency of the specific key entered from the specific key list region 340 exceeds the least usage frequency (S92). If it is not exceeded (No in S92), then the process is ended as it is. If it exceeds (Yes in S92), then a specific key of the lowest input frequency at the present is removed from the input candidate key group and the input specific key is added to the input candidate key group (S93).

According to the third embodiment, the usage status of the specific key by the user is learned without user's awareness. The input candidate group is successively updated so that a specific key with higher usage frequency can be automatically displayed on the specific display region 300. Furthermore, in the case of using any of the aforementioned function key, the third embodiment may be not applied to the functional keys. According to the embodiment, the key group with a comparatively high usage frequency can be automatically customized depending on the usage status of the user.

In the above description, preferred embodiments of the present invention have been described. Various modifications and variations other than those described above will be allowable. For example, but not shown in the figure, the configuration of the display screen shown in FIG. 3 may be modified such that the page switching and the key-based movement may be selectively performed according to the moving speed of the touching position. The specific display region utilizes the position of a space key arranged on the center of the lower side of the QWERTY layout. However, the position of the space key is not limited to such a position. Alternatively, the space key may be placed on another position. In the above description, the removal of a specific key from the input candidate key group and the addition thereof from the specific key to the input candidate group may be manually performed by the user.

What is claimed is:

1. An electronic device, comprising:
   circuitry configured to:
      control displaying a first display section including a first plurality of operation keys and displaying a second display section including a second plurality of operation keys; and
   a touch sensor that is configured to detect a moving touch input at one of the second plurality of operation keys in the second display section,
   wherein the circuitry is further configured to:
      detect an input at one of the second plurality of operation keys displayed in the second display section;
      determine a direction of the input;
      in a first case that the direction of the input is in a first direction, switch the second plurality of operation keys displayed in the second display section to a third plurality of operation keys based on the input, wherein the second plurality of operation keys are assigned to a first page of operation keys and the third plurality of operation keys are assigned to a second page of operation keys;

in a second case that the direction of the input is in a second direction perpendicular to the first direction, change the second plurality of operation keys displayed in the second display section by performing a scrolling operation;

determine whether a subsequent page is available to be displayed in response to the input in the first direction and an end of page being displayed; and display the subsequent page only in response to the input in the first direction and the circuitry determining the subsequent page is available to be displayed.

2. The electronic device according to claim 1, wherein the touch sensor is further configured to detect a single touch input at one of the second plurality of operation keys in the second display section, and the circuitry is configured to activate an operation corresponding to the one of the second plurality of operation keys.

3. The electronic device according to claim 1, wherein the circuitry is configured to compare a speed of the moving touch operation against a predetermined threshold value and activate an operation corresponding to the one of the second plurality of operation keys when the speed of the moving touch operation is less than the predetermined threshold value.

4. The electronic device according to claim 1, wherein the circuitry is configured to cyclically switch between the second plurality of operation keys displayed in the second display section and the third plurality of operation keys.

5. The electronic device according to claim 1, wherein the second plurality of operation keys displayed in the second display section include operation keys corresponding to character inputs.

6. The electronic device according to claim 1, wherein the circuitry is configured to obtain a usage frequency of each of the first plurality of operation keys and the second plurality of operation keys, and change positions of the first and second pages of the operation keys based on the usage frequency.

7. The electronic device according to claim 1, wherein the circuitry switches the second plurality of operation keys in an endless loop.

8. The electronic device according to claim 1, wherein the second plurality of operation keys and the third plurality of operation keys are configured to be switched bi-directionally.

9. The electronic device according to claim 1, wherein the second plurality of operation keys and the third plurality of operation keys comprise a set of identical characters.

10. The electronic device according to claim 1, wherein the third plurality of operation keys include a combination of character keys and functional keys.

11. The electronic device according to claim 1, wherein the circuitry is further configured to:

control displaying a non-numeric graphic page indicator in the first display section graphically indicating a position of a currently displayed page among a plurality of available pages of operation keys;

determine a usage condition of respective ones of the second plurality of operation keys in the second display section; and based on the usage condition of the respective ones of the second plurality of operation keys in the second display section, change a key position of at least one of the second plurality of operation keys in the second display section to a different position, wherein the second plurality of operation keys are used for inputting of characters.

12. A non-transitory computer readable medium storing computer readable instructions that, when executed, cause a computer to:

control displaying a first display section including a first plurality of operation keys and displaying a second display section including a second plurality of operation keys;

detect an input at one of the second plurality of operation keys displayed in the second display section;

determine a direction of the input;

in a first case that the direction of the input is in a first direction, switch the second plurality of operation keys displayed in the second display section to a third plurality of operation keys based on the input, wherein the second plurality of operation keys are assigned to a first page of operation keys and the third plurality of operation keys are assigned to a second page of operation keys;

in a second case that the direction of the input is in a second direction perpendicular to the first direction, change the second plurality of operation keys displayed in the second display section by performing a scrolling operation;

determine whether a subsequent page is available to be displayed in response to the input in the first direction and an end of page being displayed; and display the subsequent page only in response to the input in the first direction and the subsequent page being determined as available to be displayed.

13. The non-transitory computer readable medium according to claim 12, wherein the instructions, when executed, further cause the computer to:

control displaying a non-numeric graphic page indicator in the first display section graphically indicating a position of a currently displayed page among a plurality of available pages of operation keys;

determine a usage condition of respective ones of the second plurality of operation keys in the second display section; and based on the usage condition of the respective ones of the second plurality of operation keys in the second display section, change a key position of at least one of the second plurality of operation keys in the second display section to a different position, wherein the second plurality of operation keys are used for inputting of characters.

14. A method for displaying content on a display of an electronic device, the method comprising the steps of:

controlling display of a first display section including a first plurality of operation keys and display of a second display section including a second plurality of operation keys;

detecting an input at one of the second plurality of operation keys displayed in the second display section;

determining a direction of the input;

in a first case that the direction of the input is in a first direction, switching the second plurality of operation keys displayed in the second display section to a third plurality of operation keys based on the input, wherein the second plurality of operation keys are assigned to a first page of operation keys and the third plurality of operation keys are assigned to a second page of operation keys;

in a second case that the direction of the input is in a second direction perpendicular to the first direction, changing the second plurality of operation keys displayed in the second display section by performing a scrolling operation;

determining whether a subsequent page is available to be displayed in response to the input in the first direction and an end of page being displayed; and display the subsequent page only in response to the input in the first direction and the subsequent page being determined as available to be displayed.

15. The method of claim 14, further comprising:

controlling display of a non-numeric graphic page indicator in the first display section graphically indicating a position of a currently displayed page among a plurality of available pages of operation keys;

determining a usage condition of respective ones of the second plurality of operation keys in the second display section; and based on the usage condition of the respective ones of the second plurality of operation keys in the second display section, changing a key position of at least one of the second plurality of operation keys in the second display section to a different position, wherein the second plurality of operation keys are used for inputting of characters.

* * * * *